United States Patent
King

(10) Patent No.: US 10,330,090 B2
(45) Date of Patent: Jun. 25, 2019

(54) GENERATING ELECTROSPRAY FROM A FERROFLUID

(71) Applicant: MICHIGAN TECHNOLOGICAL UNIVERSITY, Houghton, MI (US)

(72) Inventor: Lyon Bradley King, Allouez, MI (US)

(73) Assignee: MICHIGAN TECHNOLOGICAL UNIVERSITY, Houghton, MI (US)

( * ) Notice: Subject to any disclaimer, the term of this patent is extended or adjusted under 35 U.S.C. 154(b) by 626 days.

(21) Appl. No.: 14/769,847

(22) PCT Filed: Feb. 28, 2014

(86) PCT No.: PCT/US2014/019234
§ 371 (c)(1),
(2) Date: Aug. 24, 2015

(87) PCT Pub. No.: WO2014/134386
PCT Pub. Date: Sep. 4, 2014

(65) Prior Publication Data
US 2016/0010631 A1    Jan. 14, 2016

Related U.S. Application Data

(60) Provisional application No. 61/771,593, filed on Mar. 1, 2013.

(51) Int. Cl.
*F03H 1/00* (2006.01)
*B64G 1/40* (2006.01)
*B05B 5/025* (2006.01)

(52) U.S. Cl.
CPC ........... *F03H 1/005* (2013.01); *B05B 5/0255* (2013.01); *B64G 1/405* (2013.01); *F03H 1/0056* (2013.01)

(58) Field of Classification Search
CPC .......... F03H 1/00; F03H 1/0037; F03H 1/005; F03H 1/0056; F03H 1/0012;
(Continued)

(56) References Cited

U.S. PATENT DOCUMENTS 3,238,715 A * 3/1966 Reader ................. F03H 1/0056
310/11
6,208,080 B1   3/2001 King et al.
(Continued)

FOREIGN PATENT DOCUMENTS

WO       2014134386       9/2014

OTHER PUBLICATIONS

PCT/US2014/019234 International Search Report and Written Opinion dated Jun. 23, 2014 (6 pages).
(Continued)

*Primary Examiner* — Thai Ba Trieu
*Assistant Examiner* — Loren C Edwards
(74) *Attorney, Agent, or Firm* — Michael Best & Friedrich LLP

(57) ABSTRACT

An electrospray device for generating electrospray from a ferrofluid. The electrospray device includes an emitter, an extraction electrode, and a magnet. The emitter is configured to receive a ferrofluidic liquid. The extraction electrode includes an aperture and is positioned a first distance from the emitter. The magnet generates a magnetic field in a first direction toward the emitter. The magnetic field causes Rosensweig instability in the ferrofluidic liquid, and generates a ferrofluidic peak in the ferrofluidic liquid. The magnet is positioned a second distance from the emitter, and the emitter is positioned between the extraction electrode and the magnet. The ferrofluidic liquid is biased at a first electrical potential and the extraction electrode is biased at a second electrical potential. A difference between the first
(Continued)

1300 electrical potential and the second electrical potential is sufficient to generate an electric field at the ferrofluidic peak that generates electrospray from the ferrofluidic peak.

20 Claims, 25 Drawing Sheets

(58) Field of Classification Search
CPC ...... B05B 5/0255; B64G 1/405; H01J 49/165; H01J 49/167; B05D 1/06
USPC ....... 60/202, 203.1; 313/359.1, 360.1, 361.1, 313/362.1; 315/111.81
See application file for complete search history.

(56) References Cited

U.S. PATENT DOCUMENTS 6,996,972 B2 * 2/2006 Song ....................... B05B 5/008 60/202
8,138,749 B1 3/2012 Paranjape et al.
2008/0213853 A1 9/2008 Garcia et al.
2010/0025575 A1 2/2010 Demmons et al.
2011/0007446 A1 1/2011 Song
2012/0267810 A1 10/2012 Mao et al.

OTHER PUBLICATIONS

PCT/US2014/019234 International Preliminary Report on Patentability and Written Opinion of the International Searching Authority dated Sep. 15, 2015 (6 pages).
Quill et al., "Electrospray Patterns of Oil-Based Ferrofluids," specification from Proc. Esa Annual Meeting on Electrostatics (2011) pp. 1-6, http://www.electrostatics.org/images/F2.pdf.
Yarin et al., "Upward Needleless Electrospinning of Multiple Nanofibers," brochure (2003) pp. 2977-2980.

* cited by examiner

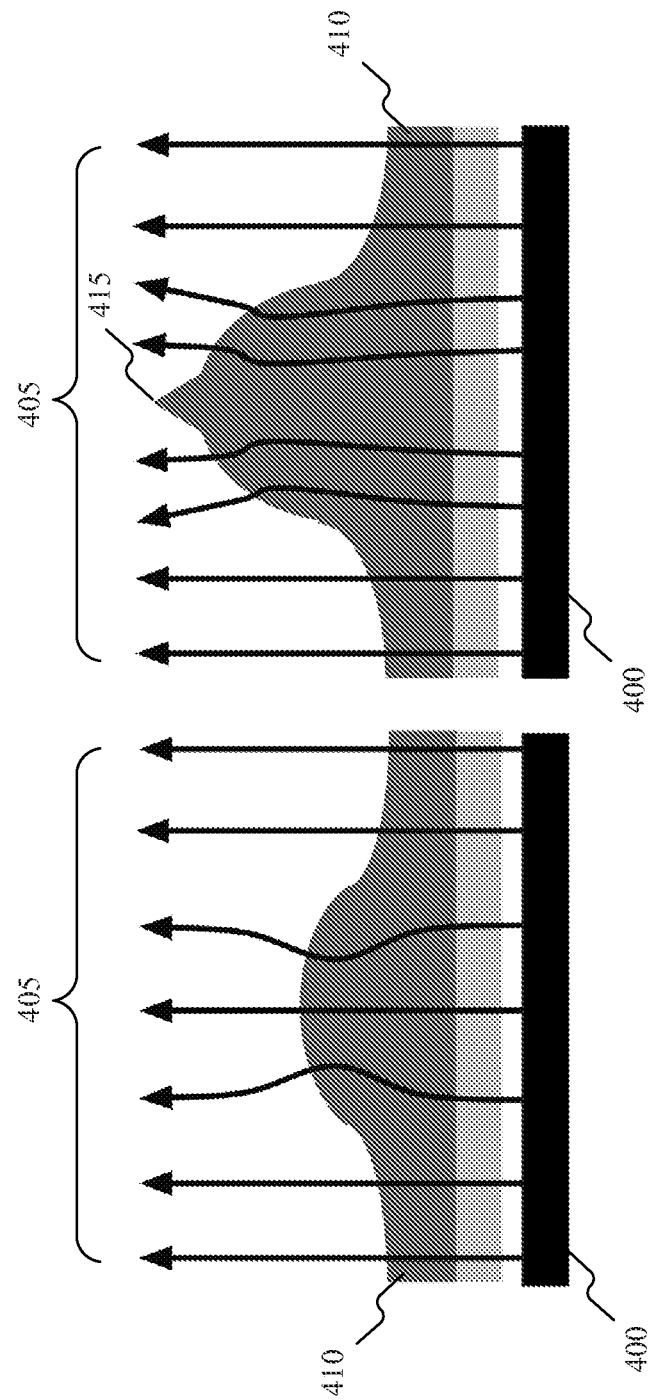

GENERATING ELECTROSPRAY FROM A FERROFLUID

RELATED APPLICATIONS

This application is a national stage filing under 35 U.S.C. 371 of International Application No. PCT/US2014/019234, filed Feb. 28, 2014, which claims priority to U.S. Provisional Application No. 61/771,593, filed Mar. 1, 2013, which are incorporated herein by reference in their entireties.

FEDERALLY SPONSORED RESEARCH

This invention was made with government support under contract number FA9550-09-1-0695 awarded by the Air Force Office of Scientific Research ("AFOSR"). The government has certain rights in the invention.

BACKGROUND

This invention relates to the generation of electrospray from a fluid by applying, for example, an electric field to the fluid. One application of electrospray is for electric space propulsion ("EP"), although electrospray has been used for other applications as well (e.g., mass spectrometry aerosol generation, etc.). EP devices are used for in-space maneuvering of satellites, interplanetary crafts, and other spacecraft after they have been delivered into orbit by a launch vehicle. EP devices generate thrust forces in a similar manner to traditional rockets (e.g., chemical propulsion devices). Rockets expel propellant into space. The result of the propellant being expelled is a reactive thrust force exerted on the spacecraft in the opposite direction. Conventional rockets utilize propellants that have intrinsic stored chemical energy that can be released through combustion. The propellant is burned and the resulting hot gasses are expelled through a nozzle under the force of their own internal pressure. By contrast, EP devices or thrusters utilize non-combustible propellants that are expelled under the force of a field (e.g., an electric field).

SUMMARY

There are many types of EP thrusters, such as arcjets, resistojets, gridded-ion thrusters, magnetoplasmadynamic thrusters, and Hall-effect thrusters. The types of EP thrusters differ based on the underlying physics of their operation. For example, a Hall-effect thruster ("HET") operates using xenon as a propellant gas. Xenon is an inert gas and cannot be burned. Rather, a HET imparts kinetic energy to the xenon using electric processes. The xenon is first ionized by generating an electrical discharge between an anode and cathode. The discharge is powered by an electrical power supply (e.g., solar panels). During the discharge, most of the xenon atoms release a single electron, resulting in a net positive charge for those xenon atoms. The xenon ions are then accelerated out of the thruster by an electric field applied by a direct current ("DC") power supply. The exhausted beam of high velocity xenon ions imparts a thrust on the spacecraft in the direction opposite that of the exhausted xenon ions. A typical xenon HET is an approximately 5 kilogram ("kg") device and consumes approximately 2 kilowatts ("kW") of electrical power to create approximately 100 milli-Newtons ("mN") of thrust. The xenon ions are accelerated to approximately 20,000 meters per second ("m/s") and the xenon HET is about 60% efficient in converting electrical power into usable kinetic energy in the exhaust beam.

For many space missions, however, such performance from an EP thruster is insufficient. For example, it is often desirable for a thruster to produce more than 100 mN of thrust for 2 kW of electric input power. Unfortunately, EP thrusters such as HETs have limited capacity for improving on their inherent thrust-to-power ratios and efficiencies. Additionally, scalability of the thrusters is desirable for larger or smaller spacecrafts, such as the emerging class of "pico-satellites," which require thrusters having a total mass of only a few hundred grams. The smallest HETs have a mass of a few kilograms because HET technology is not generally used in applications having power requirements smaller than a few hundred Watts.

Recently, a new class of EP thrusters, known as electrospray thrusters ("ETs"), has been developed. ETs operate differently than traditional EP devices, such as the HETs described above. Rather than using gaseous propellants, ETs utilize an electrically conductive liquid propellant. Such propellants include liquid metals such as indium, gallium, or cesium, or room-temperature molten salts known as ionic liquids. ETs have the capability of achieving efficiencies as high as 80% and can be scaled from a few milli-Watts of power for devices that weigh a few hundred grams up to kilo-Watts of power for devices that weigh tens of kilograms. Additionally, ETs can be operated over a wide range of thrust-to-power levels by manipulating various operating characteristics.

ETs exploit a phenomenon known as electrospray or electric-field-induced ionization. When a strong electric field is applied at the surface of an electrically conducting or electrically polarizable liquid, an electric stress results that pulls on the surface of the fluid. This stress can cause either of two behaviors of the liquid: (1) liquid droplets having a net electrical charge can be extracted from the surface and accelerated away by the electric field; or (2) single molecular or atomic ions can be "field evaporated" from the liquid into the gas phase and accelerated away by the electric field. Either of these behaviors will result in a net thrust if the exhausted material is directed away from the device.

The applied electric field must be very intense to induce electrospray. The intrinsic surface tension of the liquid acts to bind the liquid together and resist any stress that is exerted on its surface. Electric fields with a magnitude of a few mega-Volts ("MV") per millimeter ("mm") are required to induce electrospray from most liquids. Such magnitudes for the electric fields are generated using specially shaped electrodes. The only practical way to generate electric fields having magnitudes approaching $10^9$ V/m is to exploit the geometric enhancement of electric fields around very sharp electrode tips. In such 'field effect' electrode gaps a sharp needle is electrically biased and placed in the vicinity of a counter electrode. Solving Poisson's equation demonstrates that the magnitude of the electric field very near the tip of the needle is much greater than would be expected based on an applied voltage and the electrode gap spacing alone.

The electric field between two planar electrodes is determined by the voltage difference between the electrodes and the spacing between the electrodes. If, for example, a planar conducting liquid surface served as one of the electrodes, a voltage of 1 MV would need to be applied to a counter electrode located 1 mm away from the liquid in order to induce droplet and/or ion electrospray from the surface. In practical applications, such voltages cannot be used because spontaneous voltage arcs would prohibit a voltage with such a magnitude from persisting. However, the field in the gap between a needle-shaped electrode and a planar counter electrode is specified by the voltage, the gap spacing, and the radius of the needle tip. As an illustrative example, an electric field of $10^9$ V/m can be created near the surface of a 0.25-micron-radius tip located 1-mm from a planar counter electrode with an applied voltage of only 1 kilo-volt ("kV"). Voltages of this magnitude can be sustained between the electrodes without arcing. If the tip of such a needle is coated with a conducting or polar liquid, the electric field generated by the voltage would be sufficient to induce electrospray emission from the liquid.

ETs are assembled using single or multiple micron-sized needle electrodes that have some mechanism of delivering electrically conductive or polar propellant liquid to the needle tip. The liquid-coated tip then forms one component of an electrode pair. The second electrode in the electrode pair includes a hole or aperture that is centered with respect to the needle's location. A beam of droplets and/or ions that are emitted from the needle pass through the hole in the second electrode and exit the thruster. The ejection of these droplets/ions creates a reactive thrust (e.g., for a spacecraft). State-of-the-art ETs use two types of "structural scaffolding" to create a sharp liquid tip: (1) internally-wetted hollow capillary needles where the fluid is contained inside the structure; and (2) externally-wetted solid needles where the fluid coats the outside of the structure. Schematic illustrations of these approaches are provided in FIG. 1. FIG. 1 illustrates an internally-wetted hollow capillary needle 100 and an externally-wetted solid needle 105. The capillary needle 100 has a capillary opening of approximately 10 µm. A liquid propellant 110 fills the capillary 115. The solid needle 105 has a radius of approximately 10 µm, and the liquid propellant 110 wets the external surface of the needle 120. Each of the capillary needle 100 and the solid needle 105 is operable to enhance the electric field at the surface of the liquid to approximately $10^7$ V/m. A Taylor cone 125 can then be formed in each instance to achieve the field strength necessary to cause electrospray, as described above. The capillary needle technique and the solid needle technique are each described in more detail below.

In the capillary technique, a very small-diameter hollow needle is filled with liquid that is supplied from an external pump. To produce a thruster, an array of capillaries is aligned under an array of extraction electrodes that generate an electric field. A cross section of such an apparatus 200 is shown in FIG. 2. The apparatus includes a capillary wafer 205, a bonding interface 210, and an extractor wafer 215. The propellant (e.g., an ionic liquid) is supplied to the back or upstream end of the capillaries. The capillary inner diameters are about 18-32 micro-meters or microns ("µm"). The emitters and extractors can be based on silicon-on-insulator ("SOI") wafers from a commercial supplier. The wafers consist of a thin silicon oxide layer sandwiched between two thicker single-crystal silicon layers. Various lithography, wet-etch, and deep reactive ion etch steps incrementally shape the structure. The resulting integrated thruster is, for example, a 19-capillary array with spacing of approximately 200 µm between each capillary.

The capillary tip is of sufficiently small diameter to create an electric field of approximately $10^7$ V/m. While this field is not strong enough by itself to cause electrospray from the fluid, it is strong enough to exert an attractive force on the fluid meniscus surface that is stronger than the fluid's surface tension; thus stretching the liquid away from the needle and towards the counter electrode. When this happens, instability is set into motion and the resulting geometry is known as a Taylor cone. A Taylor cone occurs when the fluid is pulled towards the counter electrode into an ever sharper tip. The radius of curvature of the distorted fluid tip is sharper than the original radius of curvature, so the electric field at the fluid tip is amplified. This results in a still larger force on the tip which distorts the meniscus into a still smaller radius of curvature. The sharp fluid tip that results has an electric field intensity that can approach $10^9$ V/m. Thus, electrospray from the cone tip can be achieved.

The externally-wetted technique is similar to the capillary technique, but the fluid is not housed inside of a hollow capillary. Rather, the fluid is used to form a thin layer that wets the exterior of a solid needle. The Taylor cone formation phenomenon described above for the capillary technique is identical for the externally-wetted technique. As an illustrative example, the needles used with the externally-wetted technique can be porous structures, shown as an electrospray device 300 in FIG. 3. The electrospray device 300 includes a fuel reserve 305, a porous substrate 310, planar emitters 315, an extraction grid 320, an acceleration grid 325, and ion beams 330. The porous structures are formed by sintering powdered metal into a thin slab. A chemical etch process is then used to shape micro tips into this slab. Ionic liquid propellant is introduced to the back of the slab. Capillary forces induce the propellant to flow through the pores and migrate to the tips. The extraction and acceleration grids are bonded downstream of the needles for beam extraction.

ETs to date have focused on fabrication strategies to create micron-sized sharp electrodes using either the capillary approach or the solid needle approach. However, because a single electrospray emitter needle must be micron-sized in order to generate the required starting field of approximately $10^7$ V/m, the thrust produced by a single needle or tip is also very small. The reaction force from a single needle emitting an electrospray beam is on the order of 1 micro-Newton ("µN").

Known devices for generating electrospray from a liquid, such as ETs, share a common feature: microfabricated solid structures that are used as "structural scaffolding" to position a layer of fluid at the top of the scaffolding. As described previously, the scaffolding can take the form of a hollow micro-capillary filled with fluid or a solid (or porous) needle having a layer of fluid wetting its surface via capillary grooves. In either implementation, the scaffolding must have a solid tip with a radius no larger than tens of microns. Such sharp electrodes are needed to create a sufficiently large electric field to initiate Taylor cone instability in the liquid. As described above, the Taylor cone further amplifies the field to a value of approximately $10^9$ V/m, which is strong enough to produce electrospray. The structural scaffolding of ETs is crucial to producing electrospray since classical liquids do not form stable sharp tips on their own (i.e., without being shaped by an underlying solid material). The need for micron-scale solid structures imposes numerous limitations on ET design.

For example, the interface between the propellant liquid and the solid material that forms the structural scaffolding is critical to an ET's operation. Both external wetting and capillary transport can be sensitive to the phenomenon of liquid "wetting." Both techniques require the liquid to adhere to and flow over a solid surface by capillary action. This process is only possible if the liquid "wets" the surface (i.e., the liquid is chemically attracted to the surface). An example of a liquid that does not wet a surface is a bead of water on a freshly waxed car. In this instance the liquid is not attracted to the surface but instead forms small droplets that attempt to limit their contact surface with the material. Such non-wetting combinations of liquids and solids would not produce the required capillary flow that allows the liquid to form a thin layer on the solid. If the propellant liquid is poorly matched to the solid material or the solid material becomes contaminated, the propellant will be naturally repelled from the tip of the needle and the ET will fail. For example, external wetting is strongly influenced by fluid impurities (e.g., in water) and/or surface contaminants (e.g., oxides) on the structural scaffolding. If the liquid/surface interaction changes during the lifetime of the device, the performance of the ET can change over time or the ET can fail altogether. Such issues are particularly problematic because the liquid/surface interface can be exposed to destructive electrochemical events during emission.

Additionally, the micron-scale tolerances required for fabrication of the emitter structural scaffolding requires time consuming and expensive protocols involving multi-step masking, etching, etc. As a result, trial-and-error type fabrication is prohibitive since a full fabrication process can take several weeks and cost tens of thousands of dollars. The micron-scale emitters of ETs are also very fragile, which is a concern because the emitters must survive, for example, launch vibrations (i.e., mechanical damage) and potential electrical arcing from high applied voltages (i.e., electrical damage) which can blunt or destroy an emitter tip.

This invention relates to generating electrospray from a device that does not use microfabricated solid emitters. In one embodiment, the invention relates to an ET that does not use microfabricated solid emitters. Such a source would solve the problems associated with solid emitters related to cost, resistance to mechanical/electrical damage, and sensitivity to wetting/de-wetting issues. The invention uses a ferrofluid (e.g., an electrically conductive liquid, a polarizable liquid, an ionic liquid ferrofluid, or another liquid that can be influenced or controlled by a magnetic field) and completely removes the reliance on solid tip structures as an underlying scaffolding for electrospray emitters. The invention is described herein primarily with respect to an ionic liquid ferrofluid, but other ferrofluids can also be used in different embodiments of the invention. Ionic liquid ferrofluids are created by doping an electrically conducting propellant (e.g., an ionic liquid or liquid metal) with ferromagnetic nanoparticles. The result is an electrically conductive ferrofluid. When exposed to a static magnetic field of sufficient strength, ferrofluids demonstrate a unique instability behavior during which a planar pool of ferrofluid can spontaneously form stationary and stable arrays of sharp peaks. The peaks are formed when the liquid is excited by a magnetic field from an external source (e.g. an electromagnet or a permanent magnet). This instability created by the magnetic field is known as the "normal field instability" or "Rosensweig instability." The invention uses Rosensweig instability to form an array of sharp peaks that are comprised entirely of fluid and require no solid structural scaffolding. The peaks that form on the surface of the ferrofluid are sufficiently sharp to produce electrospray when an electrically biased counter electrode is placed near the liquid's surface.

An ET utilizing the ferrofluid can be constructed using a counter electrode having apertures or slits that permit an exhausted electrospray beam to escape the ET and produce thrust. Such an ET alleviates the difficulties associated with microfabricated emitter tips since the micron-sharp tips of the ferrofluid are generated in the propellant itself. Such peaks are immune to damage since any perturbation of the peaks, whether it is mechanical or electrical, will be self-healed. Such an ET is also free of wetting difficulties since the fluid does not need to adhere to or flow along micron-sized channels or needles.

In one embodiment, the invention provides an electrospray device that includes an emitter, an extraction electrode, and a magnet. The emitter is configured to receive a ferrofluidic liquid. The extraction electrode includes an aperture and is positioned a first distance from the emitter. The magnet is operable to generate a magnetic field in a first direction toward the emitter. The magnetic field is sufficient to cause Rosensweig instability in the ferrofluidic liquid. The Rosensweig instability generates a ferrofluidic peak in the ferrofluidic liquid. The magnet is positioned a second distance from the emitter, and the emitter positioned between the extraction electrode and the magnet. The ferrofluidic liquid is biased at a first electrical potential and the extraction electrode is biased at a second electrical potential. A difference between the first electrical potential and the second electrical potential is sufficient to generate an electric field at the ferrofluidic peak that generates electrospray from the ferrofluidic peak.

In another embodiment, the invention provides a method of generating electrospray. The method includes receiving a ferrofluidic liquid at an emitter, applying a magnetic field in a first direction toward the emitter, biasing the ferrofluidic liquid at a first electrical potential, and biasing an extraction electrode at a second electrical potential. The magnetic field is sufficient to cause Rosensweig instability in the ferrofluidic liquid, and the Rosensweig instability generates a ferrofluidic peak in the ferrofluidic liquid. The extraction electrode is positioned a first distance from the emitter, and a difference between the first electrical potential and the second electrical potential is sufficient to generate an electric field at the ferrofluidic peak that generates electrospray from the ferrofluidic peak.

Other aspects of the invention will become apparent by consideration of the detailed description and accompanying drawings.

BRIEF DESCRIPTION OF THE DRAWINGS

FIG. 4 illustrates a ferrofluid pool in the presence of a magnetic field from a permanent magnet.

FIG. 5 illustrates a ferrofluid pool in the presence of a magnetic field from a permanent magnet and the generation of a Taylor cone.

DETAILED DESCRIPTION

Figure 1:
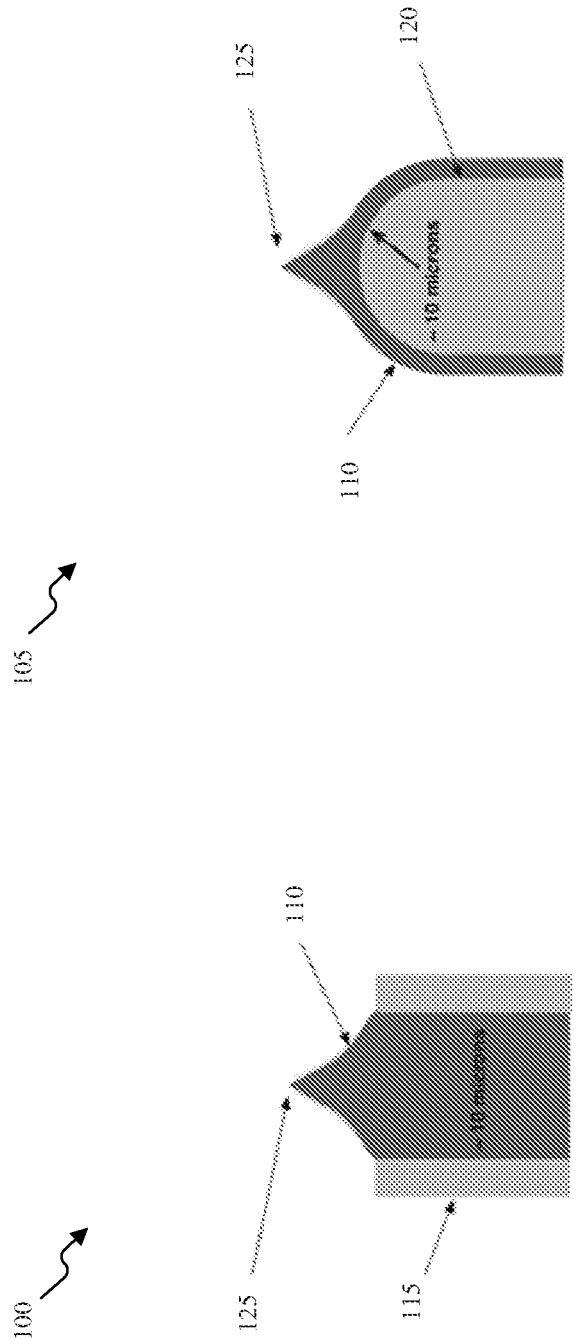
FIG. 1 illustrates an internally-wetted hollow capillary needle emitter and an externally-wetted solid needle emitter.
Figure 2:
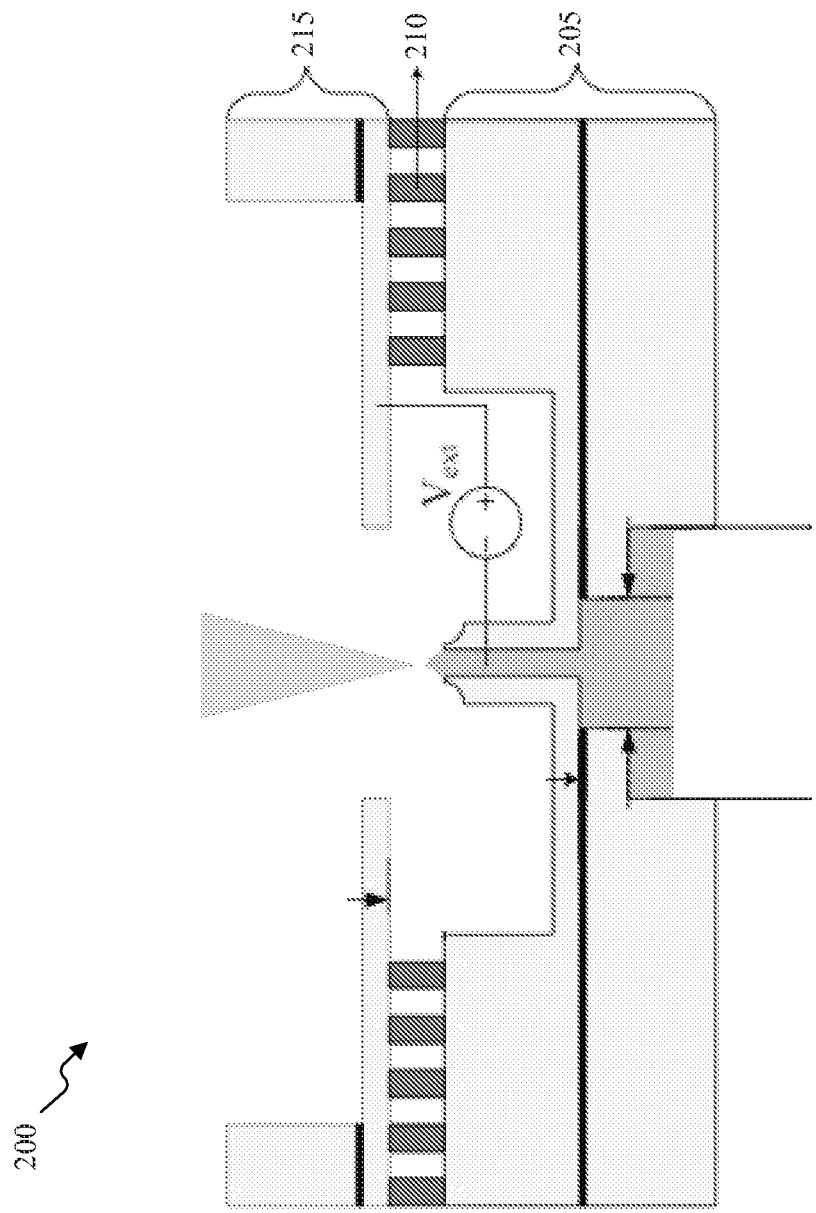
FIG. 2 illustrates an electric propulsion device including a hollow capillary needle emitter.
Figure 3:
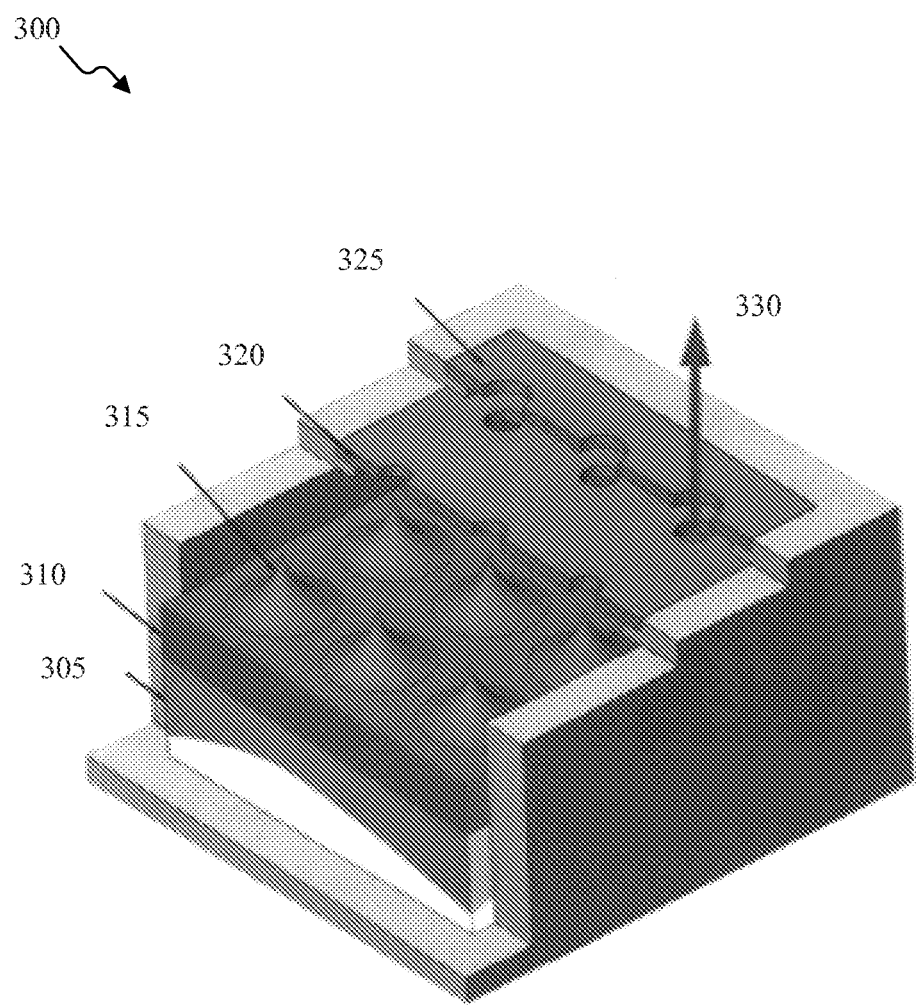
FIG. 3 illustrates an electric propulsion device including a solid needle emitter.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

The invention described herein relates to an electrospray device such as an electrospray thruster ("ET") that does not use microfabricated solid emitters. Unlike conventional electrospray devices that rely upon the use of an underlying structural scaffolding (e.g., microelectromechanically manufactured needles) for the generation of electrospray, this invention replaces structural scaffolding with a liquid. The liquid is a ferrofluidic liquid that can be influenced by the application of a magnetic field to exploit Rosensweig instability to generate one or more ferrofluidic peaks in the fluid. The magnetic field can be applied using, for example, a permanent magnet or an electromagnet. An electric field is also applied between the ferrofluidic liquid and an extraction electrode to sharpen the tips of the generated ferrofluidic peaks into Taylor cones (e.g., having diameters in the range of tens of microns), and generate an electrospray beam from the ferrofluidic liquid. The electrospray beam may include single ions or groups of molecules as well as droplets of ferrofluidic liquid. In various embodiments of the invention, a reservoir of the ferrofluidic material is connected to a trench or emitter via a pump (e.g., a diode pump) or similar device for delivering ferrofluidic material to the emitter. Such an electrospray device can be used in a variety of applications, such as an ET for maneuvering satellites, interplanetary crafts, and other spacecraft. In other embodiments, electrospray devices according to this invention can be used in applications such as aerosol generation for mass spectrometry, electrospinning of nanofibers, micro-writing (e.g., for chip manufacturing), etc. Although the electrospray devices described herein are widely applicable, the electrospray devices will be primarily described with respect to their application as ETs.

An ET constructed using a ferrofluid (e.g., an ionic liquid ferrofluid), as set forth above, possesses several advantages over ET's that utilize structural scaffolding. For example, the emitter array is self-assembling, self-healing (i.e., immune to damage), self-cleaning (i.e., immune to overspray failure), and free of interfacial wetting/de-wetting issues because the structural scaffolding of prior ETs is eliminated and replaced by the propellant itself. Each emitter in the array is able to restore itself after an arc event (i.e., electrical damage) or a mechanical perturbation such as vibrations (i.e., mechanical damage).

Additionally, because no structural scaffolding is required, the ET can be fabricated using conventional micromachining techniques (e.g., no etching, photolithography, or microelectromechanical systems ["MEMS"] protocols are required, although these and related techniques could be used). Simplified production reduces development costs, shortens the iteration cycle time for trial-and-error improvements, and increases the types of materials available for construction. The angular divergence of the beamlet emitted from the ionic liquid ferrofluid ET is also lower than ET's that utilize structural scaffolding because the axially directed magnetic field at the tip of each ferrofluid peak has a collimating effect on the beamlet that improves the efficiency of the ET.

Ionic liquid ferrofluid ETs are particularly well-suited to applications that do not operate at standard atmospheric pressure and standard gravitational force, such as in outer space. Because the ionic liquid ferrofluid propellant is magnetic, it can be manipulated and transported using magnetic body forces. The magnetic body forces are strong enough to limit uncertainty related to fluid location during to zero-gravity because the ferrofluid is always attracted to a magnet.

Ferrofluids are generally defined herein as a fluid that can be influenced by a magnetic field and demonstrate Rosensweig instability. Types of ferrofluids include electrically conductive ferrofluids, non-electrically conductive ferrofluids, polarizable liquid ferrofluids, ionic liquid ferrofluids ("ILFF"), liquid-metal ferrofluids, or another liquid that can be influenced or controlled by a magnetic field. For example, an ILFF is produced when nanometer-sized ferromagnetic particles form a stable and permanent suspension within a carrier liquid. Common carrier liquids are mineral oils, kerosene, and water. Ferrofluids can be prepared using, for example, a process known as reversible addition fragmentation chain transfer ("RAFT"). RAFT has been used to prepare, for example, short chain block copolymers from a wide range of different monomers under accessible polymerization conditions. Using RAFT, diblock copolymer steric stabilizers have been developed such that the stabilizer has an anchoring block and a stabilizing block. The anchoring block is designed to adhere to the surface of a particle being dispersed and effectively anchor one end of the stabilizer block to the surface of the particle. Moreover, the large range of accessible monomers gives flexibility with regard to the design of polymer stabilizers to suit a particular ionic liquid. Such stabilizer technology can used to stabilize aqueous ferrofluids and ILFFs. Additionally, it has been determined that some particles can be stabilized in certain ionic liquids (e.g., EMIM-Ac) without the use of a stabilizer.

Four carrier liquids are provided below in Table #1 which can be used for producing an ILFF propellant. Each carrier liquid can be used to produce ILFFs (e.g., by combining them with small $Fe_2O_3$ magnetic nanoparticles).

TABLE #1

Properties of Potential Carrier Liquids

| Ionic Liquid | Melting Point (° C.) | Viscosity (cP) | Density (g/mL) | Surface Tension (mN/m) | Refractive Index |
|---|---|---|---|---|---|
| EAN | 14 | 32 | 1.20 | 47.6 | 1.45 |
| EMIM-Ac | <−20 | 93 | 1.10 | ~47 | 1.50 |
| EMIM-SCN | −6 | 22 | 1.11 | 57.8 | 1.55 |
| BMIM-NtF2 | 1 | 44 | 1.43 | 46.3 | 1.42 |

With specific reference to two of the above carrier liquids, two examples of ILFF's are produced using ethyl-ammonium nitrate ("EAN") or ethyl-methylimidazolium-acetate ("EMIM-Ac"). EAN is doped with maghemite ("$Fe_2O_3$") nanoparticles that have been stabilized using a polymer surfactant. EMIM-Ac is doped with maghemite particles that are bare (i.e., uncoated) but stabilized against agglomeration through natural formation of an electric double layer around them. The ferromagnetic particles are small enough (e.g., approximately 5 nm to 100 nm) that they possess a single magnetic domain and that Brownian motion prevents them from settling out of the carrier liquid as a result of gravitational or magnetic forces. The particles are often also coated in a thin layer of surfactant to help prevent agglomerating and sedimentation. The resulting liquid is a liquid ferromagnet or, more specifically, a liquid superparamagnetic substance since permanent magnetization of the liquid is not possible. The motion and behavior of a ferrofluid is described by the field of ferrohydrodynamics, which combines the Navier-Stokes equations with the magnetostatic equations (derived from Maxwell's equations).

Superparamagnetic particles are obtained when a normally ferromagnetic material is reduced in size to the point where the particle sizes are smaller than a critical size required to have a single magnetic domain. For iron oxide type magnetic materials, this size is typically smaller than 40 nm in diameter. The Boyle diameter of a superparamagnetic particle defines the center to center distance between particles at which an attractive force equal to the random thermal energy of the particles is encountered. As an illustrative example, the Boyle diameter of a typical magnetic nanoparticle used to produce ferrofluidic electrospray is approximately 11 nm. As the particles get larger, the Boyle diameter increases as the cube of the particle diameter. In some instances, large particle size dispersions having large magnetic moments can offer unique properties to a fluid in a variety of applications. For example, in some instances, ferrofluids can be prepared that exhibit spiking behavior at relatively low particle concentrations. A reasonable range of particle concentrations (by mass) are approximately 5% to approximately 50%.

The motion of ferrofluids is complex and non-linear because they respond to applied magnetic fields and can also alter the applied magnetic field due to their superparamagnetic behavior. The most dramatic response of a ferrofluid is known as the "normal field instability" or "Rosensweig instability." This behavior is demonstrated with reference to a perfectly flat pool of ferrofluid lying on top of a permanent magnet. As illustrated in FIG. 4, a permanent magnet 400 produces a magnetic field 405 (e.g., greater than approximately 50 Gauss) directed normal to a pool surface. Nothing happens if the pool of liquid is perfectly flat and the field perfectly normal to the surface. However, when a small region of the ferrofluid surface is elevated into a bump or protrusion, the magnetic field lines within the fluid bump will be slightly bent or pinched by the geometry of the bump. The ferrofluid 410 concentrates the strength of the magnetic field within the liquid, causing a bump to form.

The bending of the magnetic field lines within the bump of the ferrofluid causes the magnetic field near the tip of the bump to be greater than the magnetic field away from the bump. Ferromagnetic substances experience an attractive force towards regions of high magnetic field strength. As a result, the fluid surrounding the bump is magnetically attracted towards the bump and additional ferrofluid flows into the bump. The height of the bump is increased by the additional ferrofluid and, in turn, the magnetic field lines are further pinched inside of the bump (e.g., having a tip diameter in the range of a few millimeters to hundreds of microns). The magnetic field strength within the bump continues to increase and causes even more ferrofluid to flow into the bump. Such a runaway condition persists while the bump grows into a tall sharp peak 415 (e.g., having a tip diameter in the range of less than a millimeter to tens of microns), as shown in FIG. 5. The growth of the peak is eventually arrested when the ferrofluid's surface tension, which works to maintain the ferrofluid's surface flat, balances the growing magnetic force. The end state is a stable and static sharp peak or a regularly-spaced pattern of sharp peaks over the surface of the fluid.

Figure 6:
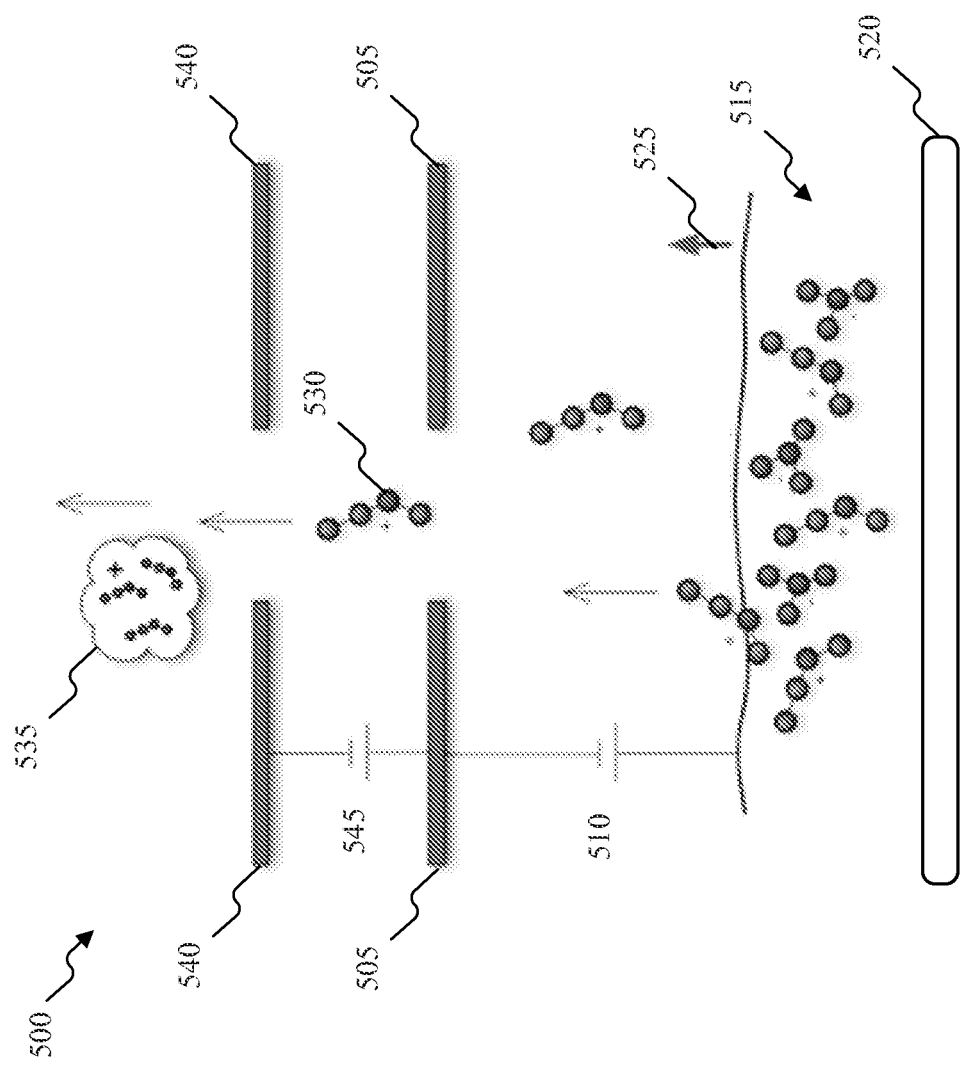
FIG. 6 illustrates an electrospray process for a ferrofluidic material that includes an extraction electrode, an acceleration electrode and a magnet.

This phenomenon is exploited in a system 500 of FIG. 6 to produce electrospray from a ferrofluid. The system 500 includes an extraction electrode 505 biased to a voltage 510 different than a pool of ferrofluid 515 and a magnet 520. The electric field 525 at the surface of the liquid is, for example, approximately $10^6$-$10^9$ V/m. The electric field 525 and the strength of the magnet 520 can be provided in various value combinations to achieve the field strength necessary to cause electrospray from a ferrofluid. The electrostatic attraction between the extraction electrode 505 and the ferrofluid 515 causes ions 530 and droplets 535 to be discharged from the ferrofluid's surface and exhausted. The system 500 also includes an acceleration/deceleration electrode 540 that can be used to add/remove kinetic energy to/from the emitted ions 530 and droplets 535. An acceleration/deceleration electrode 540 is biased to a voltage 545 that is different than the extraction electrode and can be used to set a specific impulse, $I_{SP}$, for the thruster.

Figure 8:
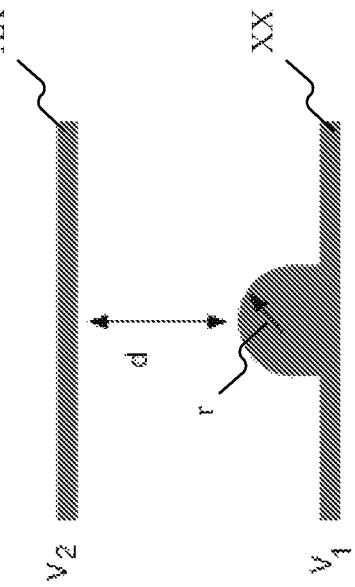
FIG. 8 illustrates relationships between electric field, voltage, and gap spacing for two field emission electrodes.
Figure 7:
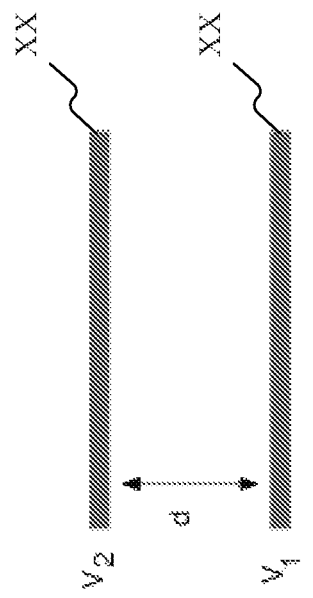
FIG. 7 illustrates relationships between electric field, voltage, and gap spacing for two planar electrodes.

In order to create electric fields of sufficient strength to cause electrospray, it is necessary to use sharp electrodes having a small tip radius, r. For example, to generate a field of approximately $10^9$ V/m between planar electrodes separated by 1 mm, it is required to maintain a voltage of 1 MV. However, a sharp tip having a radius of 0.25 μm will produce a field of approximately $10^9$ V/m across a 1 mm gap with only 1 kV. FIGS. 7 and 8 illustrate the relationships between the gap spacing, d, generated electric field, E, and the difference in the electrical potentials $V_1$ and $V_2$ between an extraction electrode 505 and the ferrofluid's surface 515. In FIG. 7, the electric field, E, required to cause electrospray is defined by EQN. 1, as set forth below:

$$E = \frac{V_2 - V_1}{d} \quad \text{EQN. 1}$$

In FIG. 8, the electric field, E, required to cause electrospray is defined by EQN. 2, as set forth below:

$$E = \frac{2(V_2 - V_1)}{r \ln\left(\frac{d}{r}\right)} \quad \text{EQN. 2}$$

Additionally, the electric field that is required to generate electrospray from a ferrofluid can be influenced by, for example, the concentration of magnetic (or polarized) particles in the ferrofluid, the viscosity of the ferrofluid, the surface tension of the ferrofluid, the conductivity of the ferrofluid, etc.

Figure 9:
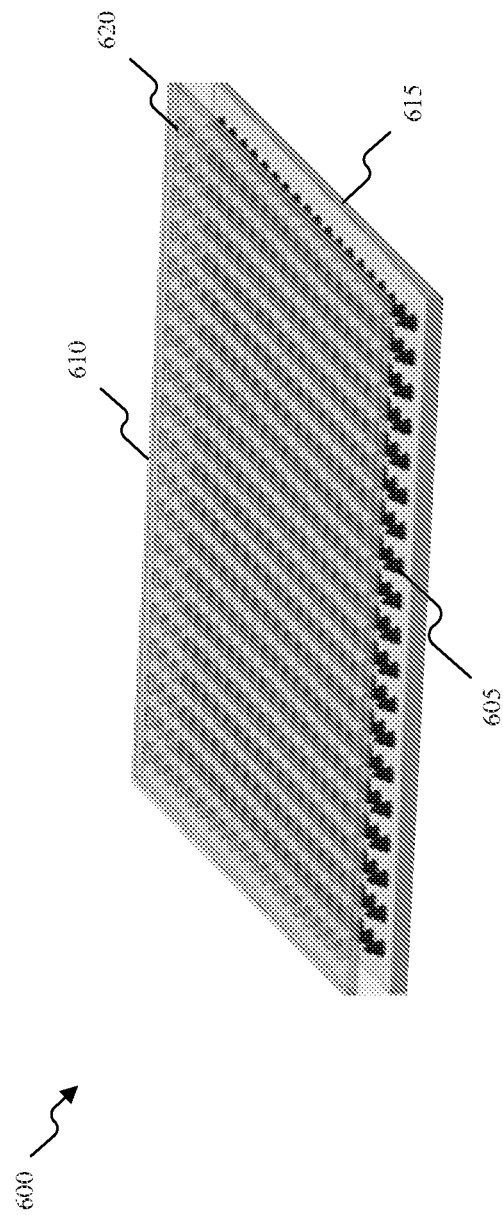
FIG. 9 illustrates an electrospray device according to an embodiment of the invention.
Figure 10:
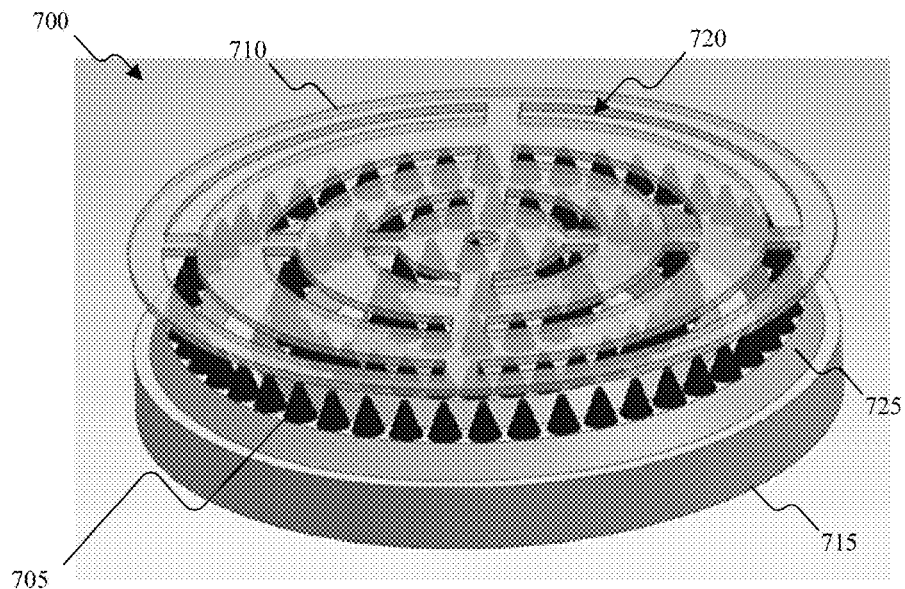
FIG. 10 illustrates an electrospray device according to another embodiment of the invention.
Figure 11:
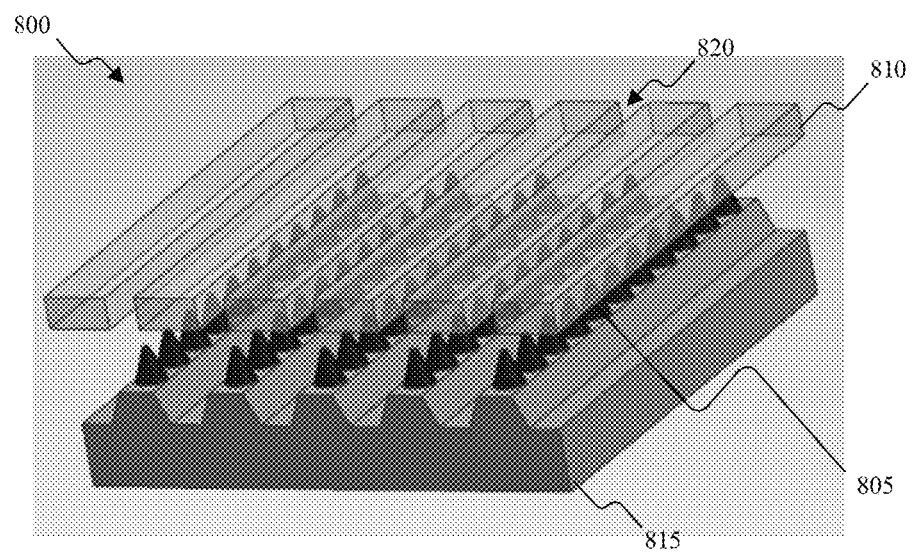
FIG. 11 illustrates an electrospray device according to another embodiment of the invention.
Figure 12:
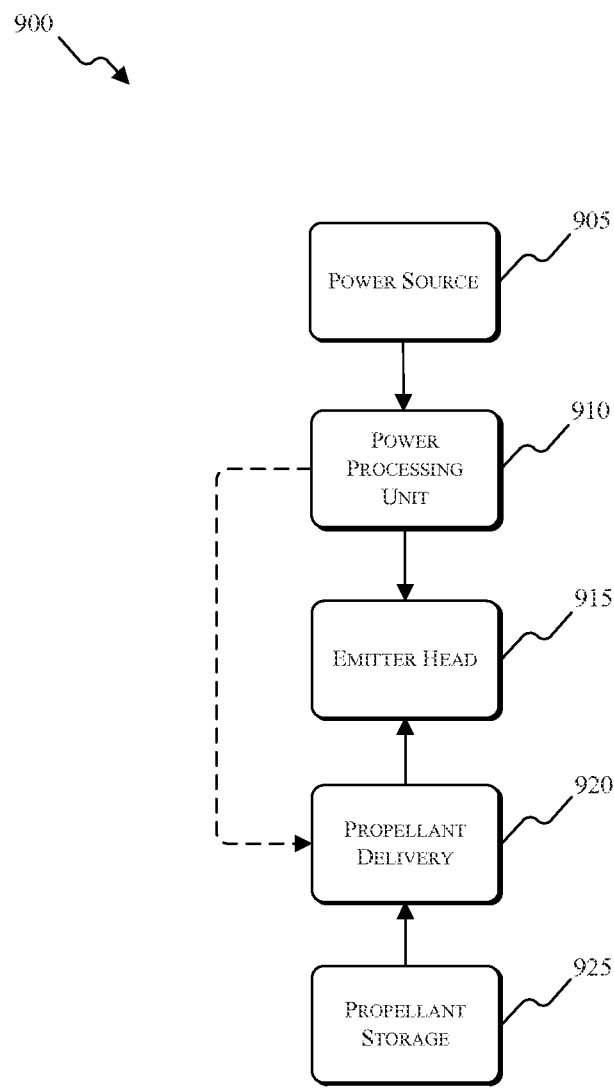
FIG. 12 illustrates an electrospray device according to another embodiment of the invention.

FIGS. 10, 11, and 12 illustrate exemplary configurations of an electrospray device (e.g., an ET). In FIG. 9, the ET 600 includes a ferrofluid 605 forming a plurality of ferrofluidic peaks or spikes, an extraction plate 610, and a base 615. The base 615 includes a permanent magnet or an electromagnet that is located behind the pool of ferrofluid. A solid ferromagnetic material, such as iron or steel can be used as a pole piece between the magnet and the ferrofluid in order to shape the resulting magnetic field as desired. The extraction plate 610 or electrode is positioned downstream of the ferrofluid peaks. The electrode 610 includes holes or apertures 620 (e.g., generally smaller than approximately a few millimeters in diameter) that allow an emitted beam of ions to be exhausted from the ET. The electrode holes 620 are aligned such that a single hole is located directly over a single generated ferrofluid peak. The extraction plate is biased to a voltage in the range of approximately 1 kV to approximately 10 kV, depending upon the performance desired. In other constructions, different bias voltages are used (e.g., voltages less than 1 kV or greater than 10 kV). However, the range of approximately 1 kV to approximately 10 kV is exemplary of a desirable bias voltage for the ET 600. Various other configurations for the extraction electrode 610 are also possible. In FIG. 10, an ET 700 includes a ferrofluid forming peaks 705, an extraction plate 710, and a base 715. In FIG. 10, the ET 700 includes azimuthal slits 720 that are aligned over circular rows 725 of ferrofluid peaks 705. In FIG. 11, an ET 800 includes a ferrofluid forming peaks 805, an extraction plate 810, and a base 815. The extraction electrode 810 includes linear slits 820, and the slits are aligned over a linear row of the ferrofluidic peaks 805.

FIG. 12 illustrates the basic structure of a ferrofluidic electrospray device 900. The device 900 includes a power source 905, a power processing unit (e.g., a power regulator, control unit, etc.) 910, an emitter head or trench 915, a propellant delivery unit 920, and a propellant storage unit 925. The power source 905 provides power to the power processing unit 910. The power processing unit 910 controls the power provided to the emitter head 915 (e.g., electrode bias values) and the propellant delivery system 920. The propellant delivery system 920 receives propellant from the propellant storage reservoir 925. By regulating the power to the propellant delivery system and the emitter head, the power processing unit 910 can control the generated electrospray.

Figure 13:
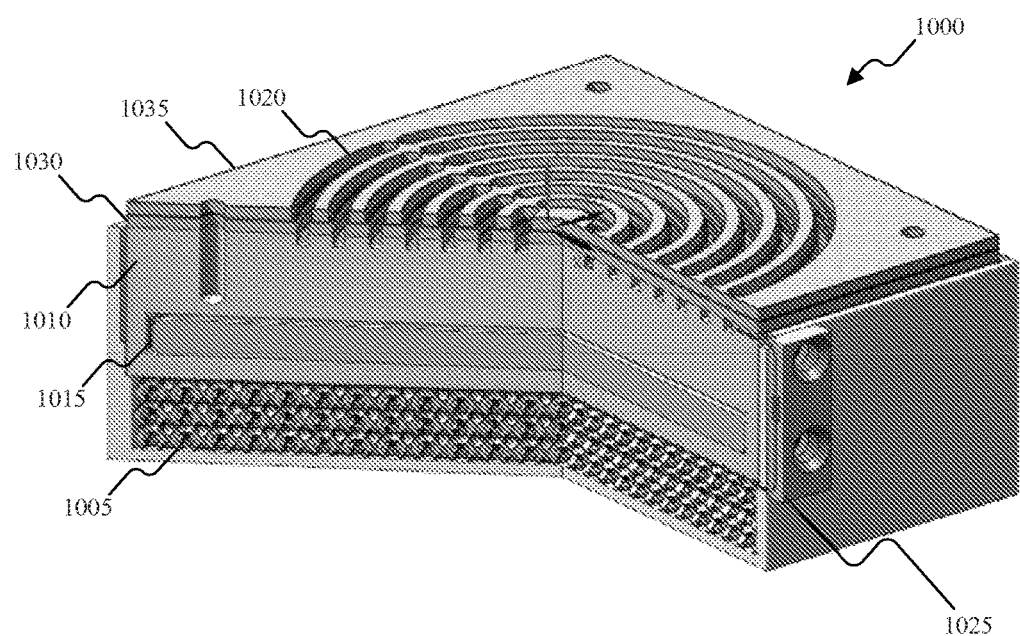
FIG. 13 illustrates an electrospray device according to another embodiment of the invention.

A more detailed illustration of a ferrofluidic electrospray device, in this instance an ET 1000, is shown in FIG. 13. The ET 1000 includes a porous packed bed reservoir 1005, a metallic substrate 1010, a permanent magnet 1015, a plurality of ferrofluidic trenches 1020, a diode pump feed system 1025, an extraction electrode 1030 (e.g., a monolithic metallized Kapton® extraction electrode layer), and an acceleration electrode 1035 (e.g., a monolithic metallized Kapton® accelerating electrode layer). The ET 1000 is packaged in rectangular or square configuration and the ferrofluidic trenches are generally circular. The extraction electrode 1030 and the acceleration electrode 1035 are integrated with the ferrofluid reservoir in order to initiate electrospray and control specific impulse from the ET 1000. The trenches 1020 are machined using conventional mechanical micromachining methods (e.g., it is not necessary to use MEMS) into a substrate in order to facilitate alignment of generated ferrofluid peaks with the apertures of the extraction and acceleration electrodes 1030 and 1035. Such mechanical micromachining can be applied to machinable materials including metals, plastics, ceramics, composites, and the like. As an illustrative example, the mechanical micromachining is achieved using a high precision, air bearing CNC micromilling machine capable of micrometer tolerances and creating features of approximately 10 microns or less on components of many millimeters. In some constructions, the ferrofluid emitter elements of the ET are milled into an acrylic or another machinable material. Such a machining process generally takes less than 30 minutes to complete. A complex array of ferrofluid peaks is generated when ferrofluid is provided to the trenches 1020 with the permanent magnet 1015 positioned behind the ferrofluid. In FIG. 13, the ET 1000 generates approximately 600 individual ferrofluid peaks over a surface area of approximately 1500 mm$^2$.

The propellant storage reservoir 1005 includes a packed bed of glass microspheres that are used to balance the magnetic pressure induced in the ferrofluid with capillary pressure such that the tank and feed system of the ET are in static equilibrium. The diode pump feed system 1025 (described in more detail below) includes a low-power (e.g., milli-Watt) electro-osmotic diode pump that is capable of feeding the ferrofluid to the trenches 1020 based on a feedback signal generated by a ferrofluid level sensor (described below).

Figure 14:
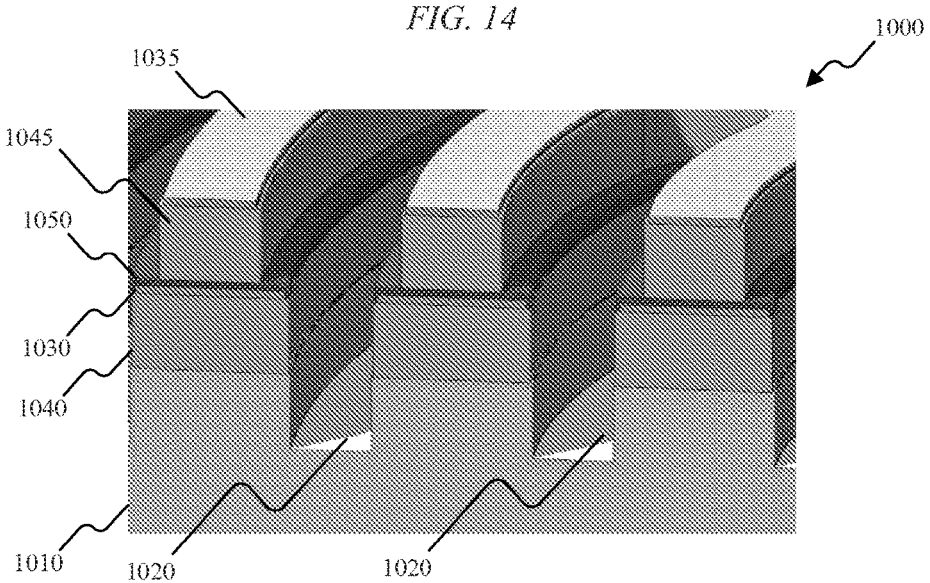
FIG. 14 illustrates trenches of the electrospray device of FIG. 13 in more detail.

The trenches or channels of the ET 1020 are illustrated in more detail in FIG. 14. The trenches 1020 to hold the ionic liquid ferrofluid. The substrate 1010 is, for example, a machinable metal (e.g., aluminum, etc.). In some constructions, the size of the trenches is approximately 1 mm wide and 1 mm deep. However, micromachining can be used to create trenches of other sizes ranging from, for example, approximately 125 microns to a few millimeters in width and depth. In some constructions, an extraction layer 1040 and an acceleration layer 1045 are constructed of Kapton®. Kapton® is available in a range of thicknesses from approximately 200 μm to a few millimeters. The extraction layer 1040 and the acceleration layer 1045 are coated with, for example, patterned metal surface features which function as the extraction electrode 1030 and the acceleration electrode 1035. The triode-like configuration of the ET allows the specific impulse, $I_{SP}$, of the thruster to be controlled independently of the voltage applied to the extraction electrode. The metal surface features of the electrodes 1030 and 1035 can be sputter-coated onto the Kapton® layers using shadow-masking or pattern etching of an integral copper clad Kapton® layer. In some constructions, the extraction layer 1040 and the acceleration layer 1045 are bonded using low outgassing, space-qualified adhesive 1050. The adhesive 1050 can be any of a variety of adhesives that can be selected based on the particular implementation of the ET. For example, the adhesive 1050 may be one of: (1) DuPont Pyralux LF® or 3M® 1205, with Kapton® NH film core coated on one or both sides by a modified acrylic adhesive; (2) Aptek® 2214-A/B carbon-filled urethane, thixotropic; (3) Wacker® Elastosil RTV-2 silicone; and (4) Master Bond Supreme HT® polymer system. In other constructions, adhesives different than those provided above are used, and the adhesives may have similar properties to those provided above. The ET 1000 is assembled by bonding the extraction electrode 1030 (i.e., the metallized extraction layer 1040), the acceleration electrode 1035 (i.e., the metalized acceleration layer 1045), and metal substrate 1010 using the adhesive 1050. The monolithic ET 1000 assembly is then machined as described above to create the trenches and apertures in the electrodes. In some constructions, the ET 1000 includes structural packaging based on requirements of the particular implementation. For example, the packaging can include a mounting capability that allows for physical and electrical integration with a satellite platform.

Figure 15:
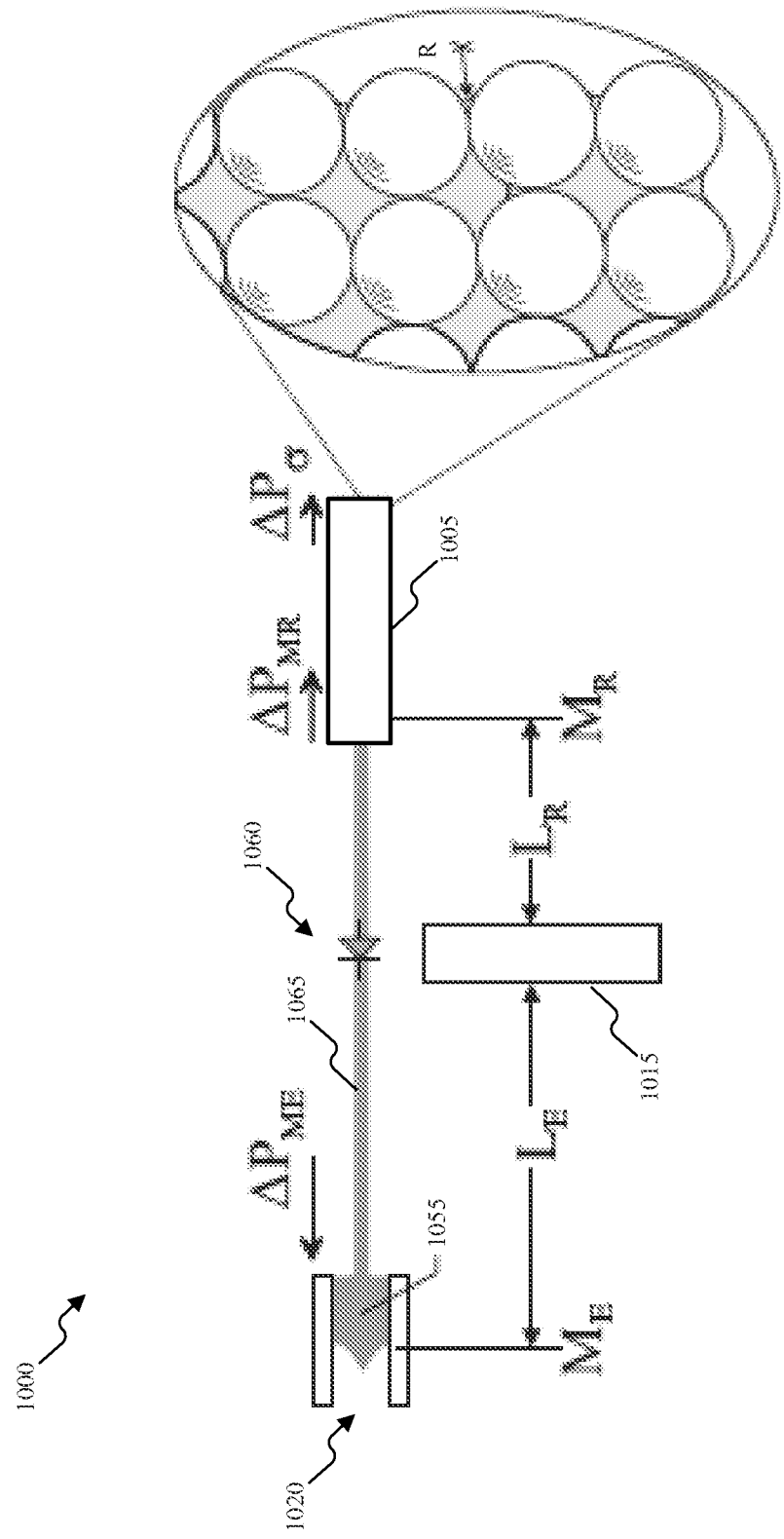
FIG. 15 illustrates a diode pump connecting a fluid reservoir to an electrospray emitter, according to an embodiment of the invention.

The mechanism by which the ET 1000 of FIG. 13 provides propellant to the trenches 1020 is demonstrated in FIG. 15. As shown in FIG. 15, the ET 1000 includes the propellant tank reservoir 1005, the permanent magnet 1015, a trench or emitter 1020 for a ferrofluid 1055, and a diode pump 1060. When a ferrofluid is in the presence of a magnetic field, it develops an internal magnetic pressure that is the result of the body force attraction of the fluid as a whole toward the magnet (i.e., the fluid squeezes itself). This internal pressure is greater in regions of a stronger magnetic field. The permanent magnet 1015 generates internal fluid pressures on the order of 40 kilo-Pascals ("kP"). The propellant tank reservoir 1005 is placed on the opposite side of the magnet from the emitter (e.g., trench) structure. The fluid in the emitter 1020 and the fluid in the reservoir 1005 both experience an internal magnetic pressure, but the distance between the permanent magnet 1015 and the reservoir, $L_R$, and the distance between the permanent magnet 1015 and the emitter 1020, $L_E$, are intentionally unequal (e.g., $L_E > L_R$ and $M_E > M_R$). In such a configuration, the internal magnetic pressure of the ferrofluid in the reservoir 1005 is greater than the internal magnetic pressure of the ferrofluid in the emitter 1020 because the magnetic field generated by the permanent magnet is greater at the reservoir 1005 than at the emitter 1020. Mechanical equilibrium is achieved when $$\Delta P_{ME} = \Delta P_{MR} + \Delta P_\sigma \qquad \text{EQN. 3}$$

where $\Delta P_{ME}$ is the pressure form the magnet 1015 toward the emitter, $\Delta P_{MR}$ is pressure from the magnet 1015 toward the reservoir, and $\Delta P_\sigma$ is capillary pressure.

If unopposed, the gradient in internal magnetic pressure could cause all of the ferrofluid propellant in the reservoir to spontaneously flow to the emitter through a connecting micro-channel 1065. However, the ferrofluid is placed in static tension equilibrium by capillary interaction with the packed bed in the reservoir. As the ferrofluid attempts to flow to the emitter, the free surface in the reservoir 1005 recedes into the packed bed of glass microspheres. The glass microspheres cause a capillary pressure that resists the flow of the ferrofluid. This capillary pressure serves to "anchor" the ferrofluid in the reservoir such that the fluid is in static tension equilibrium.

The porous matrix or bed of glass microspheres allows for variation in capillary pressure according to EQN. 4:

$$\Delta P_\sigma = 2\sigma/R \qquad \text{EQN. 4}$$

where σ is surface tension and 2/R is the menisci curvature. Although properties of the ferrofluid propellant are not fully characterized, the surface tension and density of the ferrofluid can be bounded such that a capillary pressure of 1 kPa is obtained with 40 μm<R<100 μm. FIG. 15 illustrates a cubical packing arrangement of the microspheres that provides, for example, a maximum porosity of approximately 0.467. The diameter of the glass microspheres is approximately 500 μm such that the minimum capillary pressure in the reservoir will be comparable to a 100-200 Pa pressure difference across the diode pump. Because the reservoir 1005, feed line 1065, and emitter 1020 are in static equilibrium, a low-power diode pump 1060 can be used to modulate propellant flow to the emitter 1020. The rate at which the ferrofluid is pumped is controlled based on feedback from a ferrofluid level sensor or probe associated with the emitter.

Figure 16:
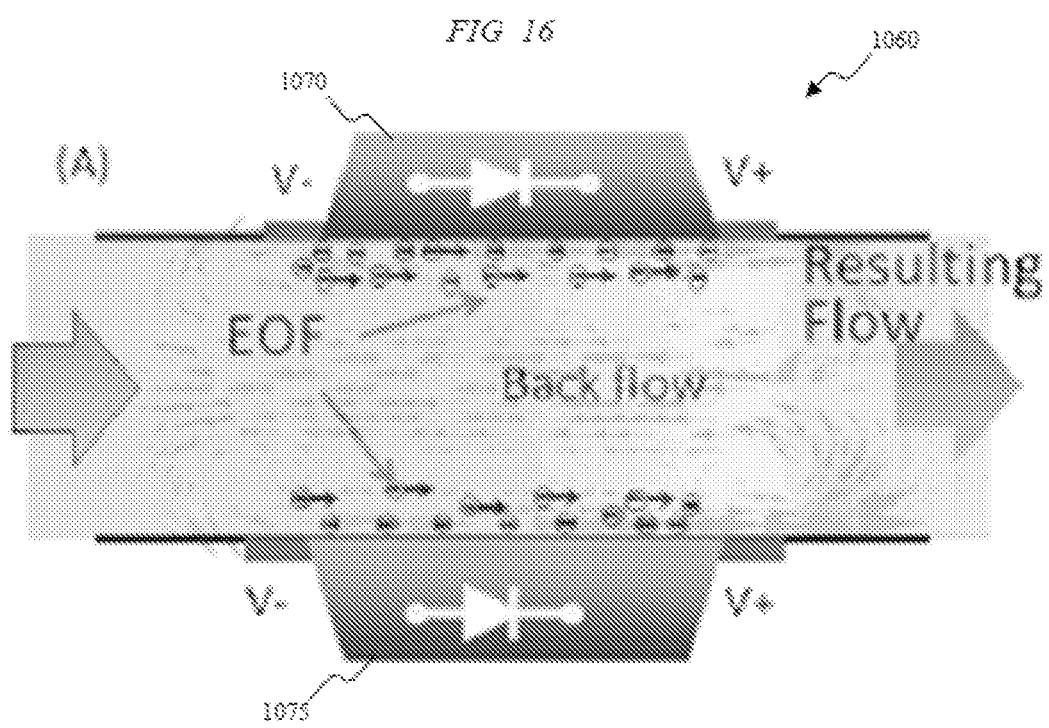
FIG. 16 illustrates a diode pump according to an embodiment of the invention.
Figure 17:
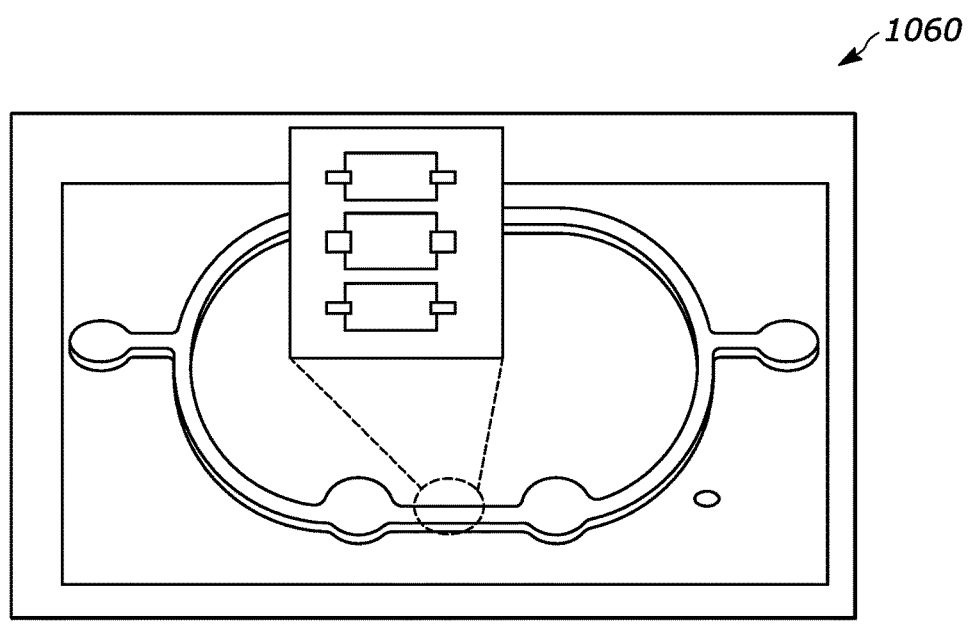
FIG. 17 illustrates a diode pump according to an embodiment of the invention.

FIG. 16 illustrates the basic principle of diode pumping. Diode pumping is a form of electroosmotic ("EOS") flow. A DC voltage is applied across the diodes 1070 and 1075 in the diode pump 1060. An EOS flow in the ferrofluid along the diode surface is generated by the DC voltage and corresponding electric field around the diodes 1070 and 1075. In a closed cavity, transient circulation is initiated along the diode surfaces due to electroosmotic fluxes when the external voltage across the diodes exceeds a standard reduction potential or minimum potential. Diode pumps are inexpensive to fabricate and operate at low power consumption (e.g., approximately 2 mW). Diode pumping has been demonstrated using ILFFs in a 500 μm microchannel. Such a diode pump and microchannel including three embedded diodes is shown in FIG. 17.

A reservoir arrangement as described is advantageous for use with an ILFF as a propellant because ILFFs have zero vapor pressure when under tension from a permanent magnet (as described above), and cavitation under this tension is not a risk. As such, the mechanical equilibrium produced by the described configuration enables the use of a minimal amount of power (e.g., approximately 2 mW) for pumping the propellant. Also, the porous matrix of microspheres does not need to be in contact with a free liquid surface in order to maintain proper saturation. At approximately 40 kPa, the magnetic Bond number, $2 \rho a V^{1/3}/\mu_0 M$, is on the order of $10^{-5}$ to $10^{-6}$, which indicates that the magnetic body force is sufficiently strong to maintain uniform saturation with accelerations, a, of 10-20 g's for a volume, V, of 8 milli-Liters. Thus, no voids will form within the porous matrix and the magnetic field will insure a uniform draw down of propellant towards the emitter. Additionally, the porous matrix of glass microspheres can accommodate a range of capillary pressures that will maintain equilibrium against the approximately 1 kPa magnetic pressure difference between the ferrofluid in the reservoir and the ferrofluid in the emitter (e.g., regardless of uncertainties in fluid properties due to, for example, temperature variation).

Figure 18:
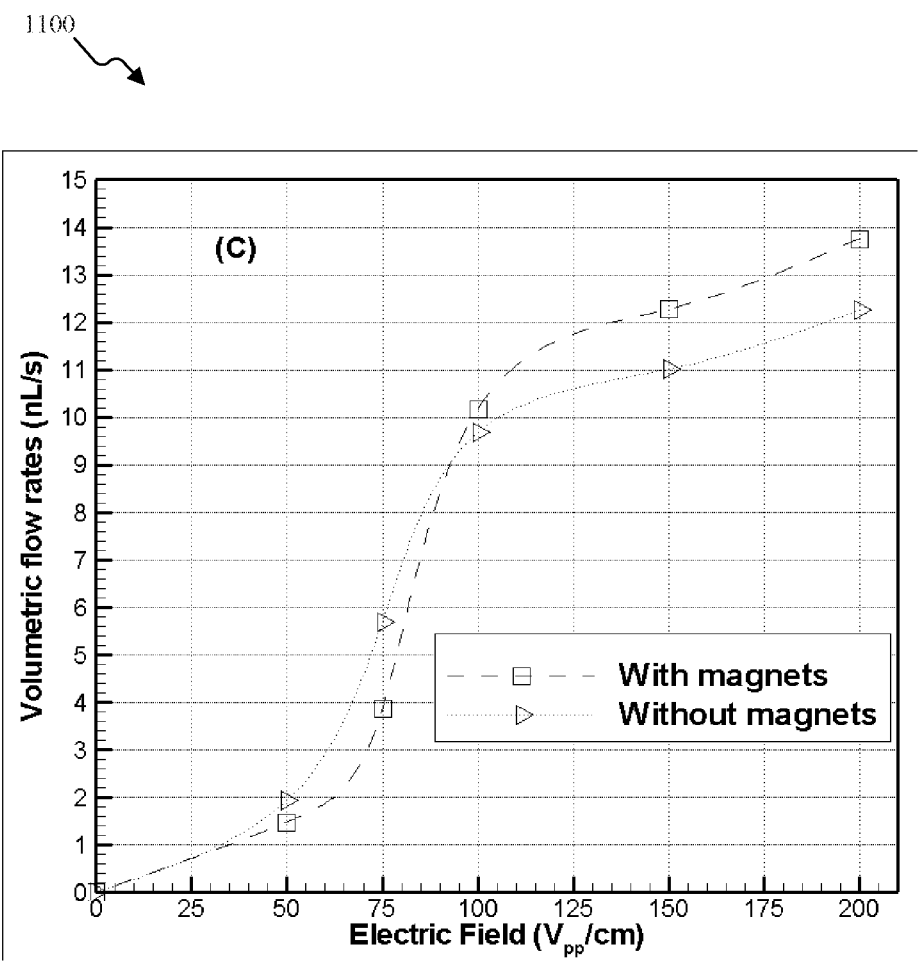
FIG. 18 is a graph of volumetric flow rates vs. electric field strength for a diode pump according to an embodiment of the invention.

FIG. 18 is a graph 1100 illustrating measured flow rates as a function of diode electric field for an EMIM-Ac ILFF using diode pump having a single 1N4007 diode with and without the presence of a permanent magnet. The graph 1100 demonstrates that such a diode pump works with ILFFs, and that the diode pump's performance is not substantially affected by applied magnetic fields. The power used by the diode pump was in the range of a few milli-Watts. Additional diodes can be added to the diode pump to increase the rate at which the ferrofluid is pumped. As an illustrative example, ferrofluid flow rates used to re-supply the trenches of an ET as they are evacuated by electrospray can be on the order of approximately 5 nL/sec.

Figure 19:
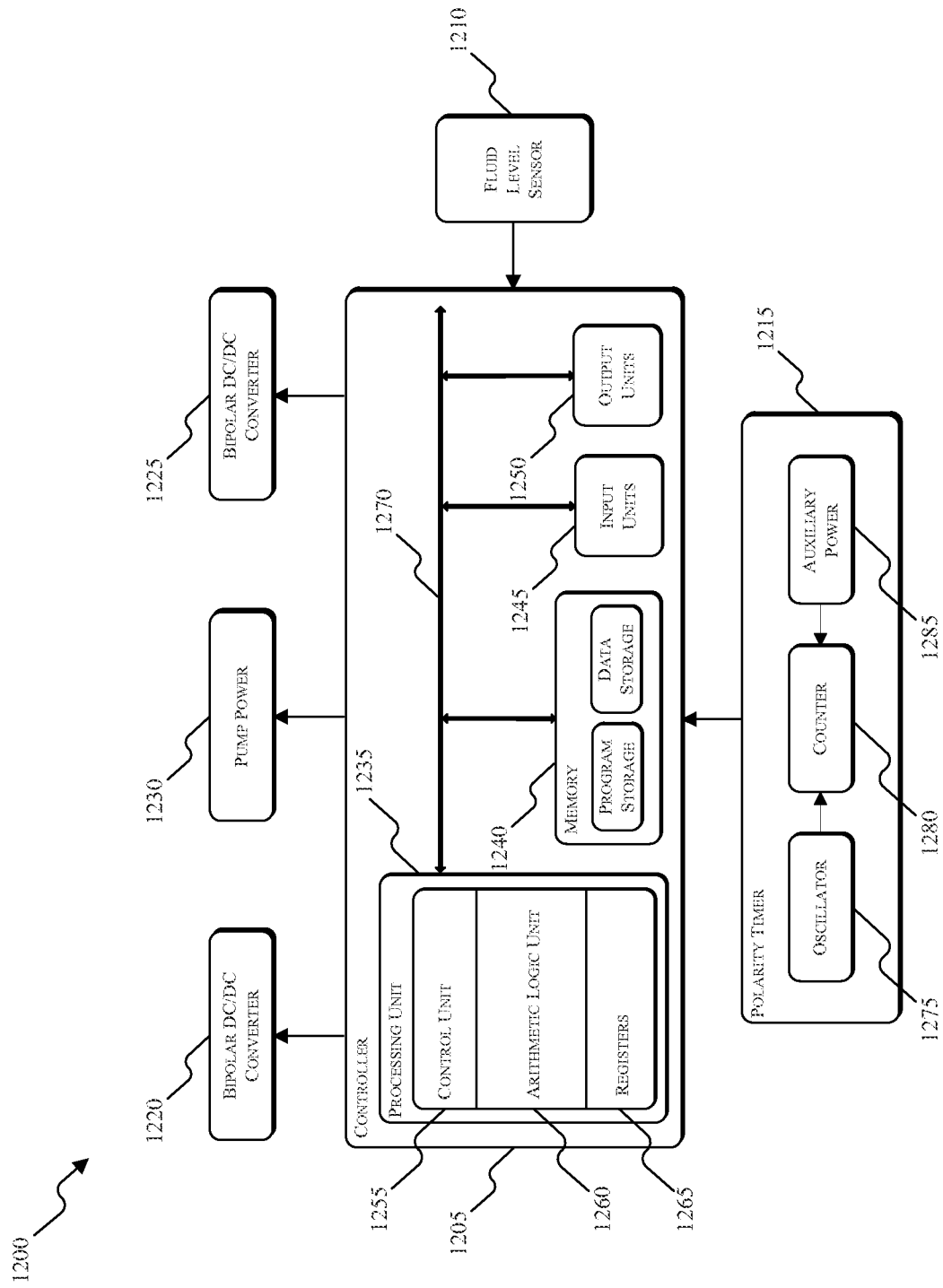
FIG. 19 illustrates a control system for an electrospray device according to an embodiment of the invention.

FIG. 19 illustrates a control system 1200 that includes a controller or control unit 1205 for an electrospray device, such as an ET, according to various constructions of the invention. The control system 1200 as illustrated is for controlling one electrospray device, although the control system could be modified to control multiple devices. Additionally or alternatively, multiple of the control systems 1200 can be implemented in a single device to achieve desired electrospray characteristics. The controller 1205 is electrically and/or communicatively connected to a variety of modules or components of the control system 1200. For example, the illustrated controller 1205 is connected to a fluid level sensor 1210, a polarity timer module 1215, a first bipolar high-voltage DC/DC converter 1220, a second bipolar high-voltage DC/DC converter 1225, and a pump power module 1230. The controller 1205 includes combinations of hardware and software that are operable to, among other things, control the operation of an electrospray device, monitor the operation of the electrospray device, etc. In some constructions, the controller 1205 includes a plurality of electrical and electronic components that provide power and operational control to the components and modules within the controller 1205 and/or control system 1200. For example, the controller 1205 includes, among other things, a processing unit 1235 (e.g., a microprocessor, a microcontroller, or another suitable programmable device), a memory 1240, input units 1245, and output units 1250. The processing unit 1235 includes, among other things, a control unit 1255, an arithmetic logic unit ("ALU") 1260, and a plurality of registers 1265 (shown as a group of registers in FIG. 19), and is implemented using a known computer architecture, such as a modified Harvard architecture, a von Neumann architecture, etc. The processing unit 1235, the memory 1240, the input units 1245, and the output units 1250, as well as the various modules connected to the controller 1205 are connected by one or more control and/or data buses (e.g., common bus 1270). The control and/or data buses are shown generally in FIG. 19 for illustrative purposes. The use of one or more control and/or data buses for the interconnection between and communication among the various modules and components would be known to a person skilled in the art in view of the invention described herein.

The memory 1240 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, or other suitable magnetic, optical, physical, or electronic memory devices. The processing unit 1235 is connected to the memory 1240 and executes software instructions that are capable of being stored in a RAM of the memory 1240 (e.g., during execution), a ROM of the memory 1240 (e.g., on a generally permanent basis), or another non-transitory computer readable medium. Software included in the implementation of the electrospray device can be stored in the memory 1240 of the controller 1205. The software includes, for example, firmware, one or more applications, program data, filters, rules, one or more program modules, and other executable instructions. The controller 1205 is configured to retrieve from memory and execute, among other things, instructions related to the control processes and methods described herein. In other constructions, the controller 1205 can be implemented using an integrated circuit such as, for example, an application specific integrated circuit ("ASIC"), a field programmable gate array ("FPGA"), a system-on-a-chip ("SOC"), or the like. Such controllers may include components or modules similar to the controller 1205 described above, be implemented with only hardware, etc. The selection and design of a controller for an electrospray device is dependent upon, for example, power requirements, size, development costs, etc. The design features described herein with respect to practical implementations of electrospray devices provides guidance to those skilled in the art related design requirements of the controller and processing system of an electrospray device. The electrospray device and the controller 1205 can be powered by, for example, one or more DC power sources such as one or more battery cells that are capable of being recharged. The battery cells can be recharged using, for example, one or more solar panels or another alternative energy source. In some constructions, energy from solar panels is used to directly power the electrospray device and the controller 1205.

The first DC/DC converter 1220 provides an electrical potential to the extraction electrode of the electrospray device and the second DC/DC converter 1225 provides an electrical potential to the acceleration electrode. The outputs of the DC/DC converters can each be switched between fixed voltage values of positive or negative polarity. The magnitudes of the positive and negative polarity voltages are not necessarily the same. The pump power module 1230 provides power diode pump for pumping the ferrofluidic propellant from the reservoir to an emitter. The power pump module 1230 is configured as a constant current power supply that provides a fluid flow rate sufficient to re-supply the trenches of an ET, as described above. The current provided to the diode pump is controlled based an output signal from the fluid level sensor 1210. The fluid level sensor 1210 includes a floating photovoltaic optocoupler and an LED optocoupler that are shorted by the ferrofluidic in an emitter trench. An open circuit indication from the optocouplers indicates low ferrofluid in the emitter trenches. The polarity timer module 1215 includes an oscillator, a counter, and an auxiliary power source. The polarity timer module can be configured to switch the polarity of the outputs of the DC/DC converters 1220 and 1225 at regular intervals to achieve charge neutralization or to mitigate electrochemical surface modification.

Charge neutralization is achieved by operating either two electrospray devices simultaneously with opposite polarity, or by alternating the polarity of a single thruster so that emitted charge is zero. Providing the necessary high voltage power to the emitter heads is complicated by the need to provide both positive and negative electrical potentials while maintaining small sizes and high efficiencies. There are only a few commercial options for providing bipolar voltages in in the kV range. These systems are often designed for industrial applications and weigh several kilograms. There are some off-the-shelf options for single polarity DC/DC converters that provide small packages at efficiencies of around 80%. To utilize the off-the-shelf DC/DC converters, switching elements would need to be employed to select the desired polarity. Switching elements come in two primary technologies: mechanical and solid state. Mechanical switches are simple and reliable devices. However, they require large amounts of power (e.g., on the order of one Watt). For electrospray devices requiring total power consumption of less than 10 W, such a current draw can cause a substantial loss in total system efficiency. Solid state switches require about $\frac{1}{10}^{th}$ the power of mechanical switches but are often limited to voltage ratings of approximately 3000 V. In some constructions of the invention, the control system 1200 has a volume of approximately 25 cubic centimeters ("CC") and a mass of approximately 40 grams ("g"). The power required by the control system 1200 is approximately 100 mW and the DC/DC converters 1220 and 1225 are approximately 83% efficient, which results in the control system 1200 efficiency being approximately 77%. In some constructions, custom DC/DC converters are used to improve the efficiency of the system 1200. By using custom electronics rather than off-the-shelf electronics, the efficiency of the control system 1200 could reach 90%-97%. The custom electronics would be designed based on mass spectrometric measurements of an emitted electrospray beam, which can influence operating voltages.

For a pair of electrospray devices, one control system is designated as a master and another is designated as a slave. The control system 1200 of FIG. 19 is illustrated as a master. The master includes the local oscillator 1275, the counter 1280 to provide polarity switching at regular intervals, and the auxiliary power unit 1285. The auxiliary power unit provides power to the counter 1280 to maintain the current time on a given interval. Failure to keep track of the current interval during power down could result in long-term imbalance in emitted current and a corresponding spacecraft charge. A slave control system receives a signal from the master control system that causes it to always have a polarity opposite to that of the master. In some constructions, two control systems could be set as slave devices and be controlled by a central control unit.

Figure 20:
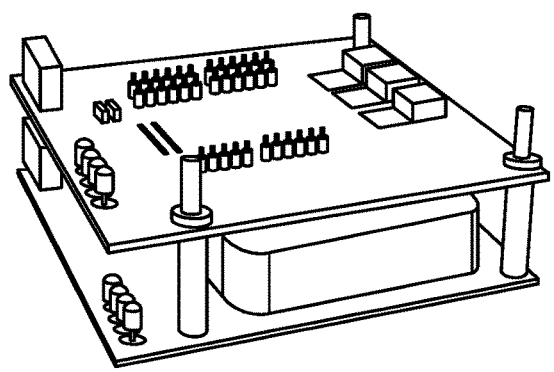
FIG. 20 illustrates a control system according to another embodiment of the invention.
Figure 21:
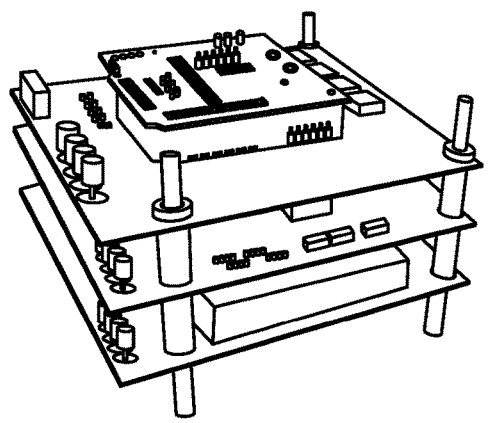
FIG. 21 illustrates a control system according to another embodiment of the invention.
Figure 22:
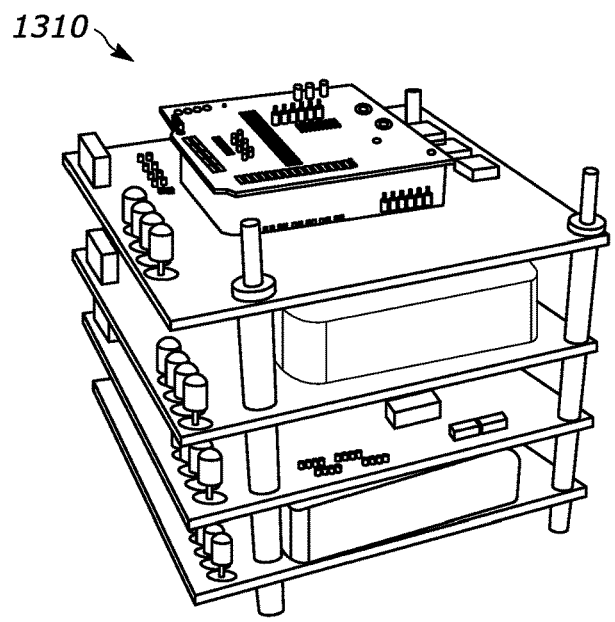
FIG. 22 illustrates a control system according to another embodiment of the invention.
Figure 23:
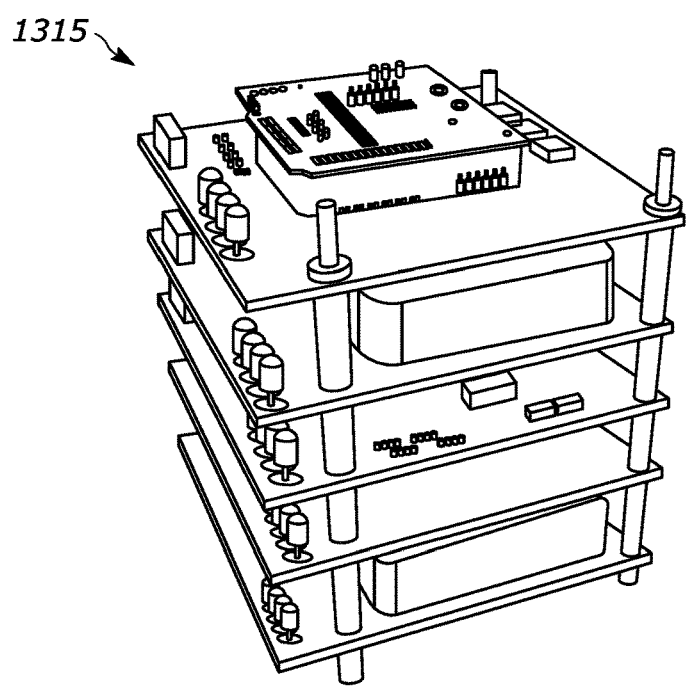
FIG. 23 illustrates a control system according to another embodiment of the invention.

FIGS. 20-23 illustrate modular control systems for electrospray devices according to constructions of the invention. The number of control systems that are deployed depends on specific application requirements. In some constructions, the control systems include heaters used to liquefy propellants (e.g., in case they have become frozen). FIG. 20 illustrates a control system 1300 for a single electrospray device with switchable voltage polarity and a diode configuration. FIG. 21 illustrates a control system 1305 for a single electrospray device with switchable voltage polarity, a diode configuration, and an onboard processor. FIG. 22 illustrates a control system 1310 for a single electrospray device with switchable voltage polarity, a triode configuration, and an onboard processor. FIG. 23 illustrates a control system 1315 for two electrospray devices with opposite polarities, a triode configuration, and an onboard processor. The control systems of FIGS. 20-23 were not necessarily optimized for size, weight, and power. However, the illustrated designs can be scaled to meet size, weight, and power requirements of a deployable ET. As described above, the control system 1200 can be miniaturized and made more efficient by using an ASIC. In some constructions, the control system is incorporated into the body of an ET, such as the ET 1000 in FIG. 14.

The performance of an electrospray device can be characterized by measurement of a variety of quantities, such as thrust ("F"), specific impulse ("Isp"), voltage in/kinetic energy out, and the angular distribution of emitted beamlets. For ETs, thrust and specific impulse can be derived from the ratio of mass-to-charge ("m/q") of the emitted propellant at a given acceleration potential ($V_{ACC}$). The equations, specified for EP systems, for evaluating the performance of an ET are set forth below on a per particle, 1, basis in EQNS. 5 and 6:

$$F = \dot{m}_i v_i = I_i \left(\frac{m_i}{q}\right) \sqrt{2 V_{ACC}\left(\frac{q}{m_i}\right)} \propto \sqrt{\frac{m_i}{q}} \quad \text{EQN. 5}$$

$$I_{SP} = \frac{F}{\dot{m}_i g} = \frac{1}{g}\sqrt{2 V_{ACC}\left(\frac{q}{m_i}\right)} \propto \sqrt{\frac{m_i}{q}} \quad \text{EQN. 6}$$

where $I_i$ is the current associated with the charged particle, $m_i$ is the mass of the charged particle, $|q|$ is the charge of the particle, $V_{ACC}$ is the voltage bias of the acceleration electrode, and g is the acceleration due to gravity.

These equations demonstrate an inverse relationship between thrust, F, and specific impulse, $I_{SP}$, for the class of thrusters where a significant specific impulse value requires emission of the smallest m/q values (i.e., a purely ionic regime). For a purely ionic regime thruster, thrust can only be increased by adding more and more individual emitters. For conventional (non-magnetic) electrospray thrusters the physical properties of a conducting liquid, such as ionic liquids, are linked to the current emitted by a Taylor cone ($I_{EM}$) and q/m ratios, as shown below in EQNS. 7 and 8:

$$I_{EM} \propto \sqrt{\frac{\gamma K Q}{\varepsilon}} \quad \text{EQN. 7}$$

$$\frac{q}{m} \propto \frac{I}{\rho Q} \propto \frac{1}{\rho}\sqrt{\frac{\gamma K}{\varepsilon Q}} \quad \text{EQN. 8}$$

where the q/m ratio is proportional to the liquid conductivity, K, the surface tension, $\gamma$, and inversely proportional to the volume flow rate, Q, liquid density, $\rho$, and dielectric constant, $\varepsilon$. Because the physical properties of the propellants are largely fixed for a given temperature, the m/q ratio can only be improved by modification of the flow rate of propellant to the emitter tip. As such, for conventional emitters, the emitted species varies depending on whether an externally wetted needle or a pressure-fed hollow capillary are used as a spray source. The m/q ratios emitted from an ILFF source will differ from that of a conventional electrospray configurations because the differences in the physical properties of the emitters (e.g., lack of structural scaffolding).

The performance evaluation of an electrospray device that includes ionic liquid propellants and ferrofluid emitters can be accomplished using two instruments. The first instrument is an electrospray—quadruple mass spectrometer ("ES-QMS") instrument that is capable of measuring the mass flow, ion current, angular distribution, and species identification (50 to 1100 amu) from an electrospray emitter system. Angular resolution is obtained by mounting the emitter on a rotating stage such that the various measurements can be made as a function of angle (e.g., between −40° and +40°).

The emitted ion beam is sampled in the near-field by means of a translation stage mounted orthogonally to the beam axis. This stage contains a quartz crystal microbalance ("QCM"), Faraday cup ("FC"), and a cylindrical lens element that allows the beam to pass into the quadruple. The FC and QCM monitor the current and mass flow, respectively, as a function of the source angle. These near-field measurements provide a baseline estimation of the average mass per charge (m/q) encountered at a specific angle. The cylindrical lens element allows the beam to pass through a 3 mm aperture with a solid angle of acceptance of approximately 6°. The passed ion beam is focused and extracted into the quadruple mass spectrometer for m/q identification. The upper mass range of the current quadruple system is approximately 1100 amu, but may be extended to approximately 4000 amu. Emitted species above this mass range (e.g., charged droplets) can be detected but their respective m/q are not accurately identified. If large droplets exist in the emitted beam, taking the ratio of mass flow to ion current can be used to provide the average m/q value for a given set of source conditions. In addition to the analytic tools described above, the back end of the ES-QMS is equipped with a retarding potential analyzer which provides kinetic energy information for specific mass-selected ions. Such an analyzer provides a direct comparison between the acceleration voltages applied to the acceleration electrode and kinetic energy losses that occur in the emission process.

The second instrument is a reflectron-time-of-flight ("TOF") mass spectrometer that expands the mass range that can be observed up to 100,000 amu. In this instrument, the kinetic energy of ions in the emitted beam is significantly diminished, which allows the instrument to provide insights into the long-term dynamics of large droplet evaporation or ion fragmentation. Due to the geometry of the instrument, the TOF experiment does not provide angularly resolved measurements.

Figure 24:
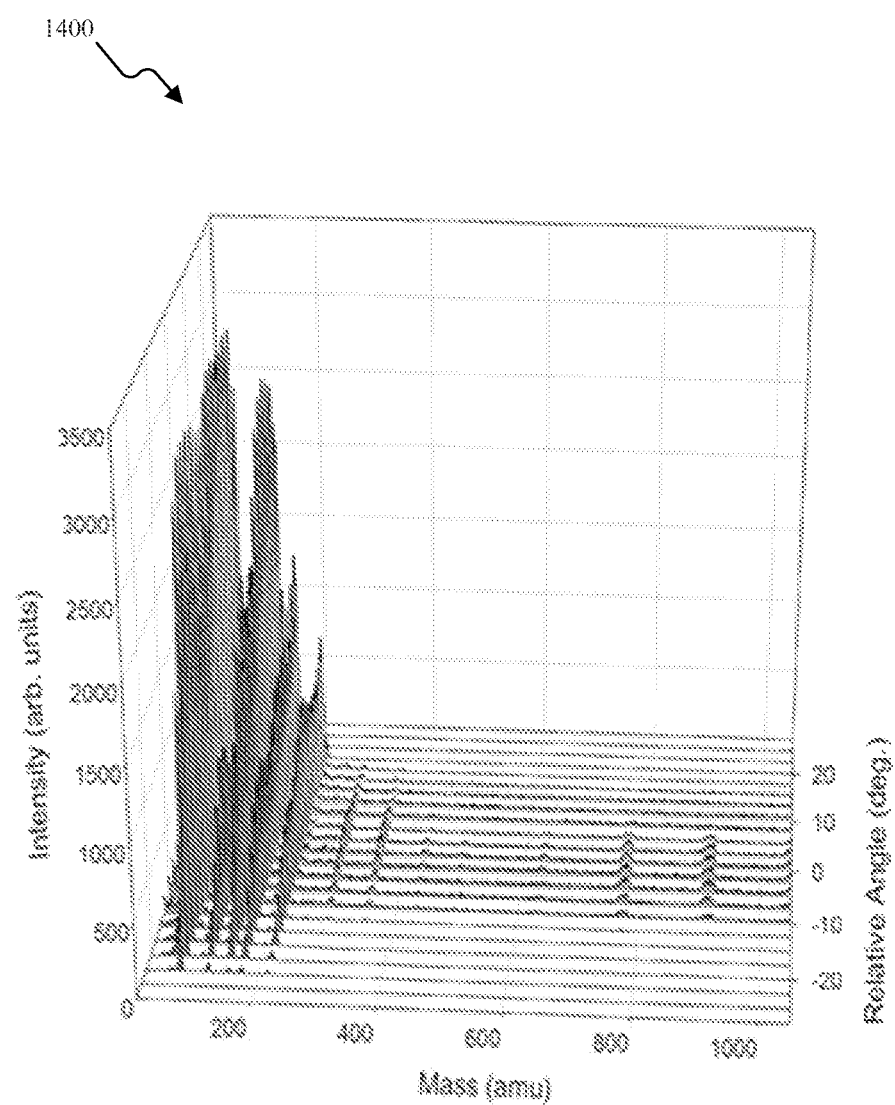
FIG. 24 is a graph of electrospray—quadruple mass spectrometer mass spectrometric analysis for an electrospray beam.
Figure 25:
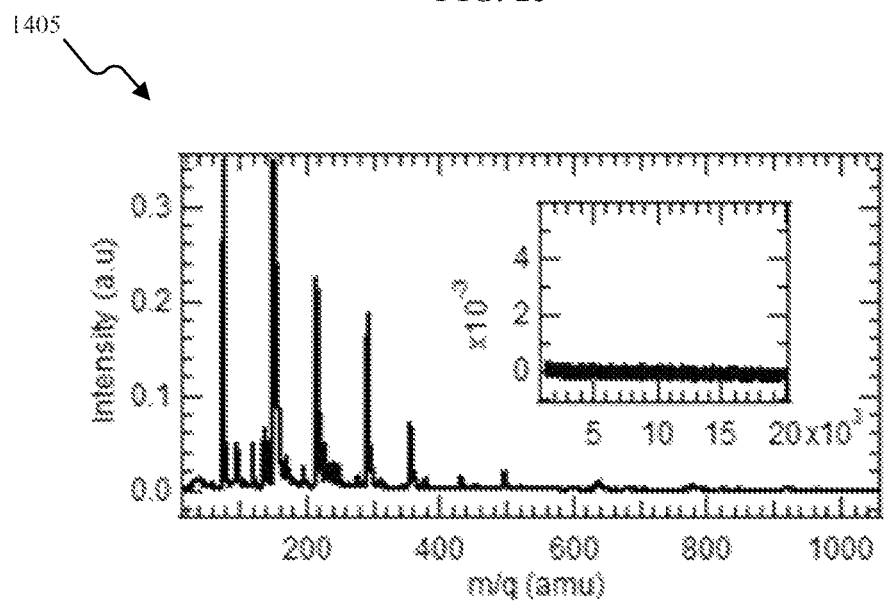
FIG. 25 is a graph of reflectron-time-of-flight mass spectrometric analysis for an electrospray beam.
Figure 26:
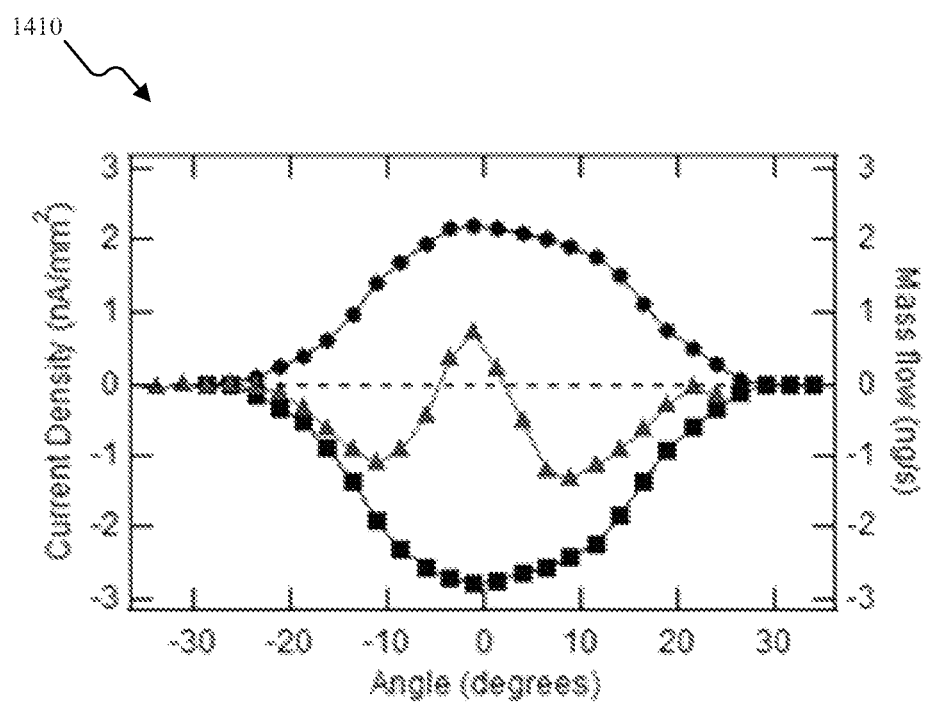
FIG. 26 is a graph quartz crystal microbalance and Faraday cup analysis of an electrospray beam.

As an illustrative example of the analysis of a ferrofluid electrospray beam, the beam characterization produced using the two above-described instruments is illustrated in FIGS. 24-26 for an ionic liquid propellant (2-hydroxyethylhydrazinium nitrate ["HEHN"]) emitted from a single titanium emitter. Angularly resolved mass spectra are shown as a graph 1400 in FIG. 24. This spectrum depicts a nearly purely ionic regime, particularly at angles outside of +/−10 degrees. Small charged ionic clusters are observed along the center axis. The TOF mass spectrum plot 1405 of FIG. 25 indicates the progression of small ion clusters ceases around 1100 amu and the 1500-25000 amu region is devoid of large droplet signals. Example FC and QCM results 1410 are illustrated in FIG. 26 for positive and negative polarity operational conditions. The emitted beam exhibits a generally symmetric spray pattern about the center emitter axis with a small amount of asymmetry on the positive side that is the result of imperfect metal emitter fabrication. The QCM results indicate generally negative mass flow resulting from sputtering of material off the QCM by the low mass 500 eV ions. The effect of sputtering is removed or minimized by decreasing the kinetic energy of the smallest ions. The average m/q value is 104 amu/q (using QCM/FC) and 141 amu/q (using ES-QMS) for positive polarity operation of this ionic liquid and using a single emitter.

The use of an ILFF introduces an additional degree of experimental control, notably, the effect of magnetic field on the dynamic emitters. This new field provides an additional method to regulate the flow of the ferrofluid to the tip of the ferrofluid emitter resulting in improved specific impulse, $I_{SP}$. These experimental techniques allow for direct investigation into the effects of magnetic field on electrospray performance in terms of altering the species emitted, spray divergence, and any alterations to the critical electric field required to field-evaporate ions from the emitter. In contrast to capillary emitters, the volumetric flow rate is more difficult to directly measure on a "needle-like" emitter. Information on the flow rate and microscopic emission behavior are determined from molecular dynamic simulations. These experimental investigations provide information as to the critical field strengths, observed species (often a function of field strength and flow rate), jet diameters, and any chemistry (such as proton transfer, fragmentation of ions, etc.) that occurs from the disclosed emitter sources.

Figure 27:
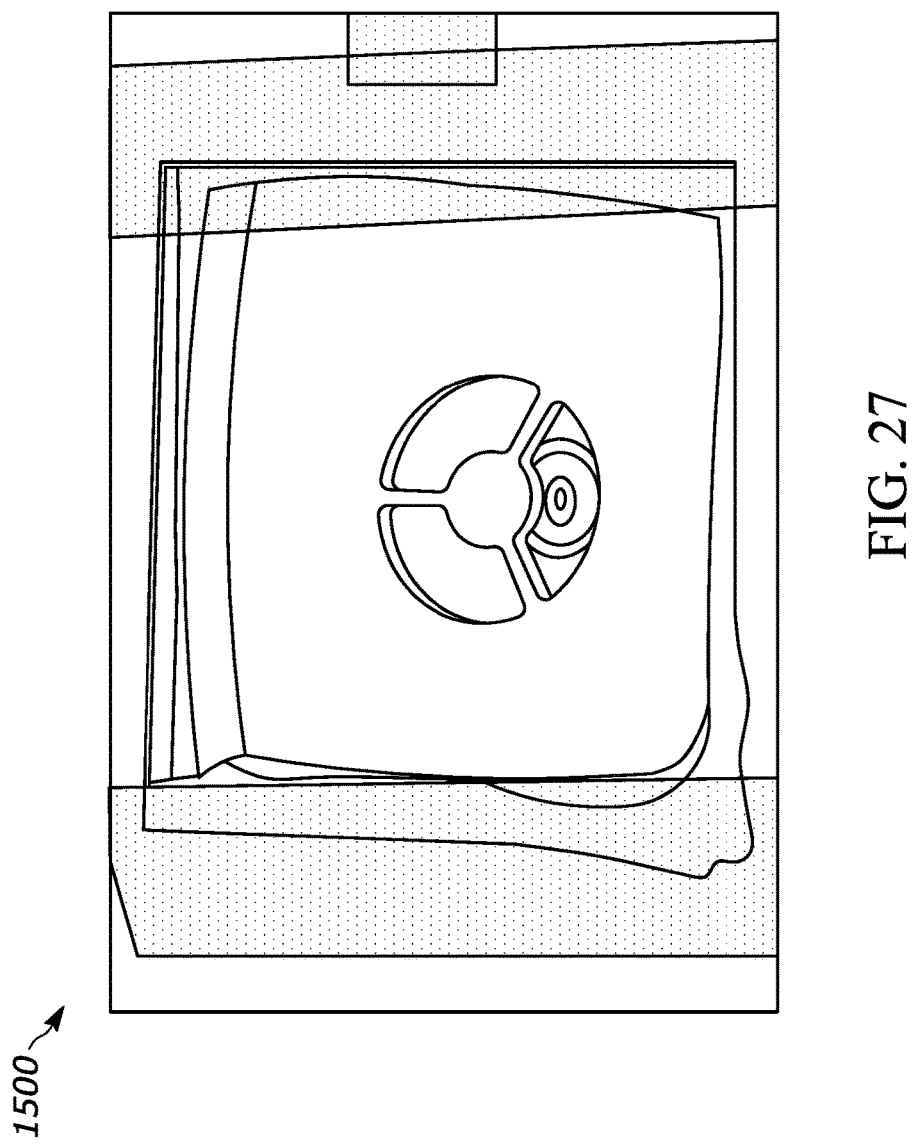
FIGS. 27-29 illustrate an electrospray thruster according to an embodiment of the invention.
Figure 28:
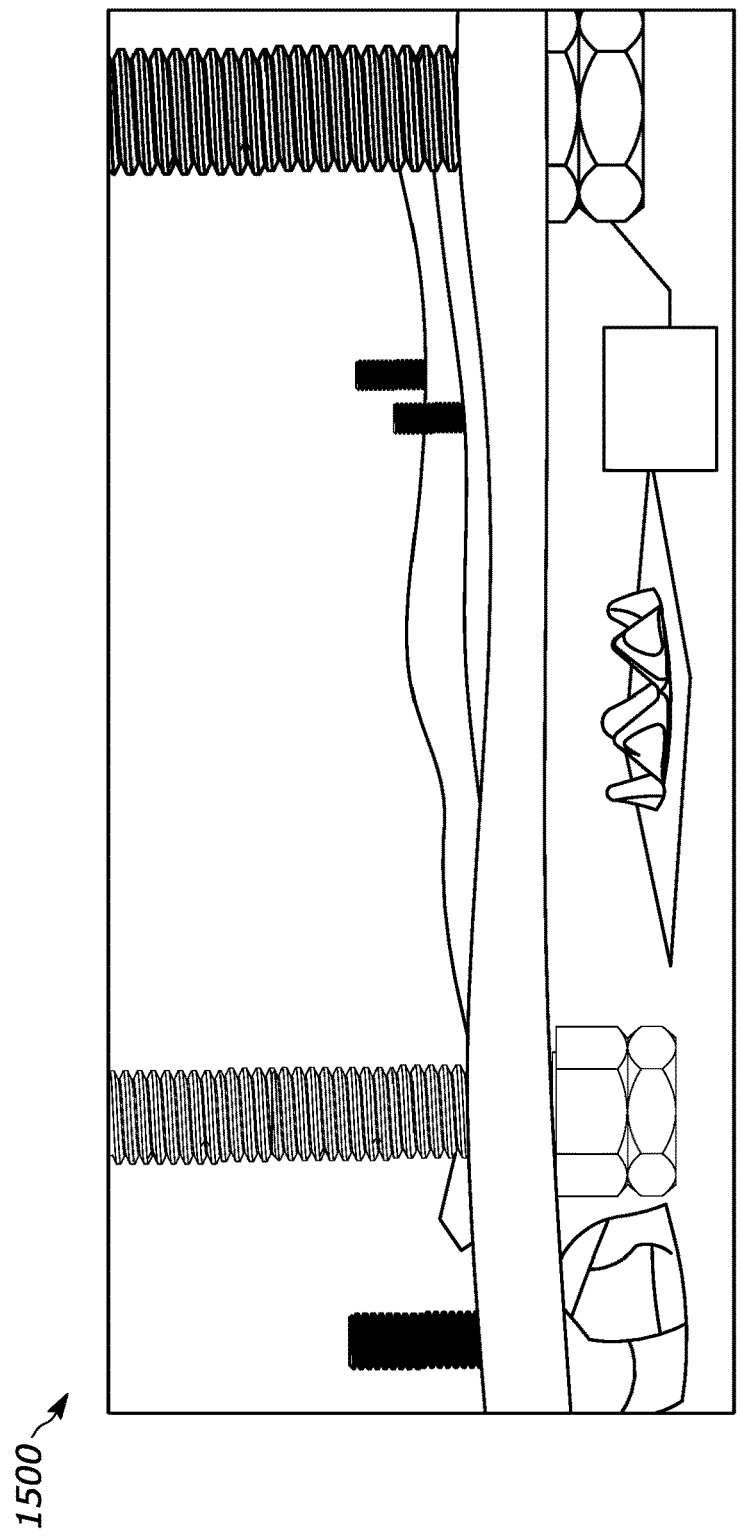
Figure 29:
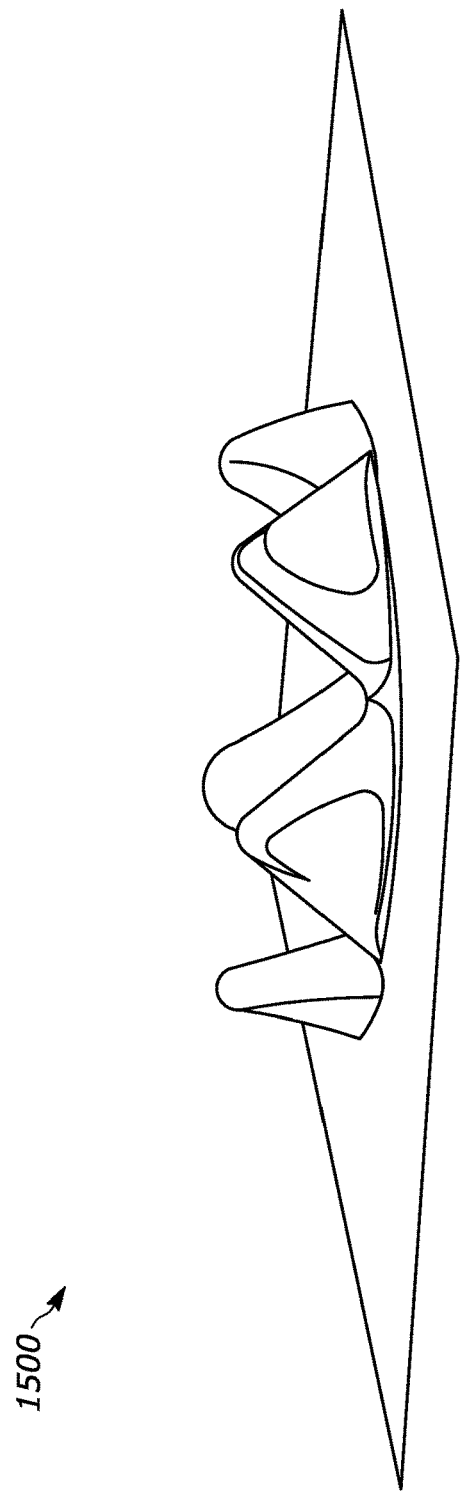
Figures 30A, 30B:
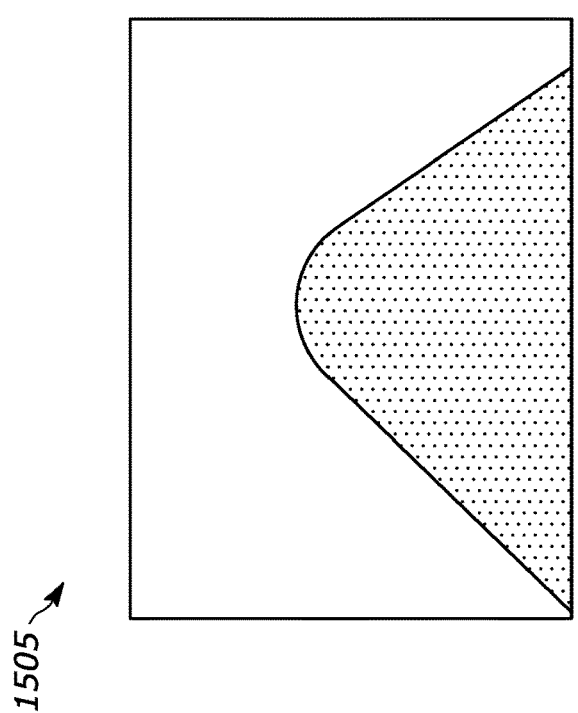
FIG. 30 illustrates Taylor cone formation for the electrospray thruster of FIG. 27.
Figure 30C:
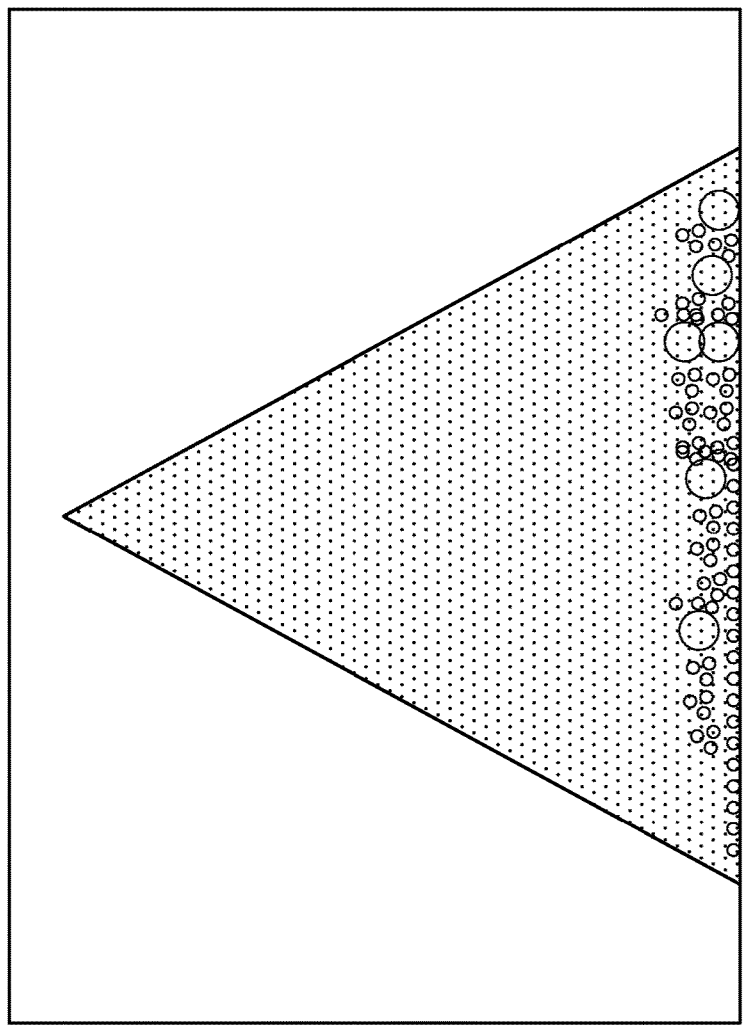
Figure 31:
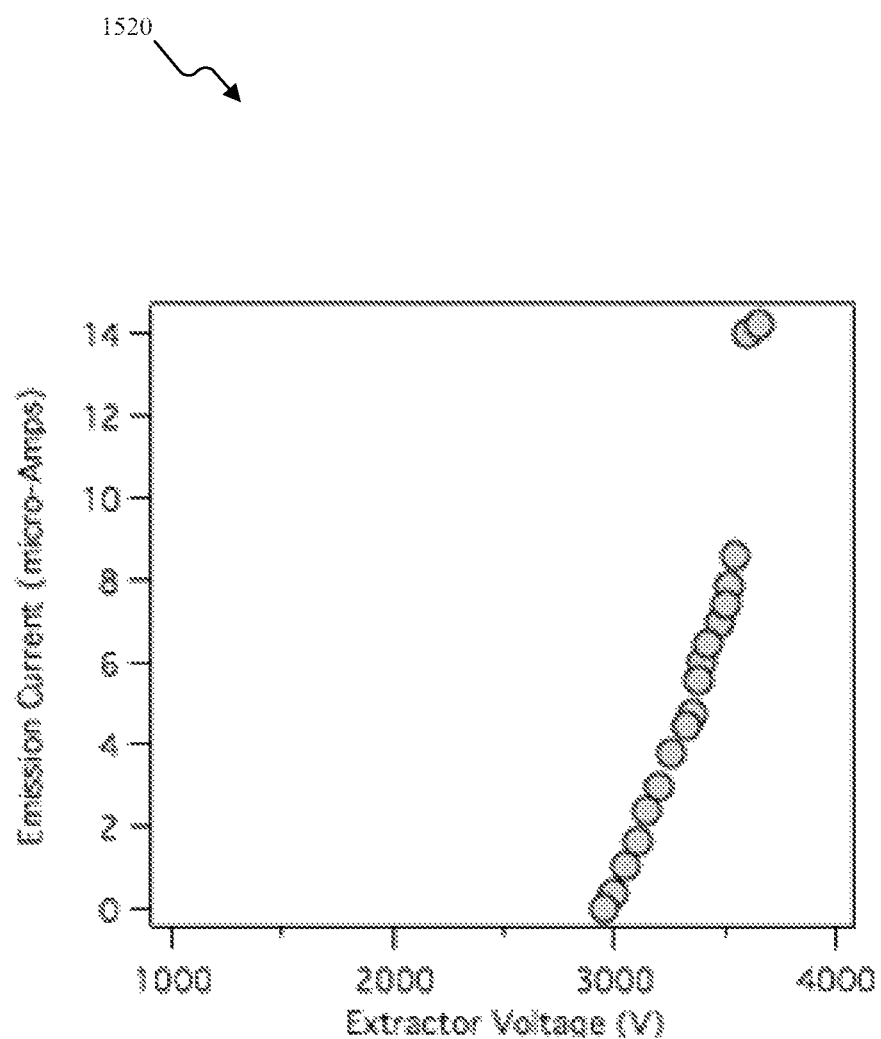
FIG. 31 illustrates a current-voltage characteristic for the electrospray thruster of FIG. 27.

An application of the invention, as described above, is as an ET that uses a ferrofluidic material to generate electrospray. An ET 1500 according to one embodiment of the invention described herein is illustrated in in FIGS. 27-29. A 7-mm-diameter circular trench is machined into an aluminum base and filled with a ferrofluid propellant. When the propellant is excited by a permanent magnet, the ferrofluid forms an array of five Rosensweig peaks. In other constructions, one or more Rosensweig peaks are generated. A circular extraction electrode was positioned approximately 4 mm from the tips and biased to induce electrospray from the ferrofluid. Downstream of the extraction electrode was a plate of indium-tin-oxide ("ITO") glass that was used to intercept the beam and measure the corresponding electrospray current. When an electric field is applied to the fluid tips using the extraction electrode, both the electrostatic and magnetostatic effects combine to cause exceedingly sharp fluid tips under lower electric fields than are required for conventional Taylor cone/jet emission. The peaks 1505, 1510, and 1515 illustrated in FIGS. 30A-30C, respectively, demonstrate the effects of the applied electric field. The radius of the cone is approximately 1 mm in each of FIGS. 30A-30C. In FIG. 30A, the voltage of the extraction electrode is 0V. In FIG. 30B, the voltage of the extraction electrode is 3.6 kV. In FIG. 30C, the voltage of the extraction electrode is 3.7 kV. The current and voltage ("I-V") characteristic of the five-tip array were recorded by measuring the current at the ITO glass. The graph 1520 current and voltage characteristics are illustrated in FIG. 31. The I-V characteristic has a sharp onset voltage followed by a rapid rise in current after onset.

Thus, the invention provides, among other things, an electrospray device that includes a ferrofluidic liquid, a magnet, and an extraction electrode. The magnetic field generated by the magnet and the electric field generated between the extraction electrode and the ferrofluidic liquid in combination are sufficient to generate an electrospray from the ferrofluidic material. Various features and advantages of the invention are set forth in the following claims.

What is claimed is:

1. An electrospray device comprising:
   an emitter configured to receive a ferrofluidic liquid including ferromagnetic nanoparticles;
   an extraction electrode positioned a first distance from the emitter; and
   a magnet operable to generate a magnetic field in a first direction toward the emitter, the magnetic field sufficient to cause Rosensweig instability in the ferrofluidic liquid, the Rosensweig instability generating a ferrofluidic peak in the ferrofluidic liquid, the ferrofluidic peak being toward the extraction electrode and away from the emitter and the magnet, the magnet positioned a second distance from the emitter, the emitter positioned between the extraction electrode and the magnet,
   wherein the ferrofluidic liquid is biased at a first electrical potential and the extraction electrode is biased at a second electrical potential, and
   wherein a difference between the first electrical potential and the second electrical potential is sufficient to generate an electric field at the ferrofluidic peak that generates electrospray from the ferrofluidic peak.

2. The electrospray device of claim 1, wherein the ferrofluidic liquid is an ionic liquid ferrofluid.

3. The electrospray device of claim 1, wherein the ferrofluidic peak is generated without an underlying structural scaffolding to support the peak.

4. The electrospray device of claim 1, wherein the Rosensweig instability generates a plurality of ferrofluidic peaks in the ferrofluidic liquid.

5. The electrospray device of claim 4, wherein the electrospray device is an electrospray thruster.

6. The electrospray device of claim 5, wherein the extraction electrode includes a plurality of apertures.

7. The electrospray device of claim 6, wherein the electrospray is ejected through the plurality of apertures in the extraction electrode.

8. The electrospray device of claim 7, further comprising an acceleration electrode.

9. The electrospray device of claim 8, wherein the acceleration electrode includes a second plurality of apertures, the second plurality of apertures substantially aligned with the plurality of apertures, and wherein the electrospray is ejected through the second plurality of apertures in the acceleration electrode.

10. The electrospray device of claim 1, further comprising a ferrofluidic liquid reservoir, the ferrofluidic liquid reservoir positioned a third distance from the magnet, the magnet positioned between the ferrofluidic liquid reservoir and the emitter.

11. The electrospray device of claim 1, wherein the magnet is a permanent magnet.

12. The electrospray device of claim 1, wherein the ferrofluidic peak is between the extraction electrode and the emitter.

13. The electrospray device of claim 1, wherein the emitter is a trench.

14. A method of generating electrospray, the method comprising:
   receiving a ferrofluidic liquid at an emitter, the ferrofluidic liquid including ferromagnetic nanoparticles;
   applying a magnetic field in a first direction toward the emitter, the magnetic field sufficient to cause Rosensweig instability in the ferrofluidic liquid, the Rosensweig instability generating a ferrofluidic peak in the ferrofluidic liquid; and
   biasing the ferrofluidic liquid at a first electrical potential and biasing an extraction electrode at a second electrical potential, the extraction electrode positioned a first distance from the emitter,
   wherein a difference between the first electrical potential and the second electrical potential is sufficient to generate an electric field at the ferrofluidic peak that generates electrospray from the ferrofluidic peak, and
   wherein the ferrofluidic peak is toward the extraction electrode and away from the emitter.

15. The method of claim 14, wherein the ferrofluidic liquid is an ionic liquid ferrofluid.

16. The method of claim 14, wherein the ferrofluidic peak is generated without an underlying structural scaffolding to support the peak.

17. The method of claim 14, further comprising ejecting the electrospray through an aperture in the extraction electrode.

18. The method of claim 14, further comprising biasing an acceleration electrode at a third electrical potential, the extraction electrode positioned between the acceleration electrode and the emitter.

19. The method of claim 18, further comprising ejecting the electrospray through an aperture in the acceleration electrode.

20. The method of claim 14, wherein the magnet is a permanent magnet.

* * * * *